(12) United States Patent
Nguyen et al.

(10) Patent No.: US 12,319,503 B2
(45) Date of Patent: Jun. 3, 2025

(54) AUTOMATED PACKAGE DELIVERY DEVICES, MACHINES, AND SYSTEMS

(71) Applicants: Thanh Dang Nguyen, Chicago, IL (US); Hung Van Hoang, Hue (VN); Ngoc Duy Nguyen, Geelong (AU); Phung Thi My Huynh, Chicago, IL (US); Tien Thi My Huynh, Ho Chi Minh (VN); Thach Ba Nguyen, Saskatoon (CA)

(72) Inventors: Thanh Dang Nguyen, Chicago, IL (US); Hung Van Hoang, Hue (VN); Ngoc Duy Nguyen, Geelong (AU); Phung Thi My Huynh, Chicago, IL (US); Tien Thi My Huynh, Ho Chi Minh (VN); Thach Ba Nguyen, Saskatoon (CA)

(73) Assignee: Thanh Dang Nguyen, Northbrook, IL (US)

( * ) Notice: Subject to any disclaimer, the term of this patent is extended or adjusted under 35 U.S.C. 154(b) by 363 days.

(21) Appl. No.: 18/069,723

(22) Filed: Dec. 21, 2022

(65) Prior Publication Data

US 2023/0126435 A1 Apr. 27, 2023

Related U.S. Application Data

(63) Continuation-in-part of application No. 17/150,436, filed on Jan. 15, 2021, now abandoned.

(51) Int. Cl.
*B65G 1/04* (2006.01)
*B65G 1/06* (2006.01)

(52) U.S. Cl.
CPC ............. *B65G 1/0485* (2013.01); *B65G 1/06* (2013.01)

(58) Field of Classification Search
CPC ................................ B65G 1/0485; B65G 1/06
See application file for complete search history.

(56) References Cited

U.S. PATENT DOCUMENTS

| 5,143,193 | A | * | 9/1992 | Geraci | G07F 7/069 414/277 |
|---|---|---|---|---|---|
| 5,206,814 | A | * | 4/1993 | Cahlander | G07F 17/0042 360/92.1 |
| 5,273,183 | A | * | 12/1993 | Tuttobene | G07F 7/069 221/121 |

(Continued)

*Primary Examiner* — Saul Rodriguez
*Assistant Examiner* — Ashley K Romano
(74) *Attorney, Agent, or Firm* — Kevin Schraven; Anooj Patel; Hankin Patent Law, APC

(57) ABSTRACT

An automated package delivery machine, comprising: a housing with auto-lock doors; carousels; and robotic assemblies. The housing may substantially enclose the carousels and the robotic assemblies, and substantially prevents unwanted access to an interior of the housing. Each carousel may comprise a plurality of storage containers, a drive belt, a motor, and one or more rails. The storage containers may each have a plurality of slots, which are configured to accept and contain one or more packages to be delivered to one or more customers. The rails may form a loop track to which the storage containers are slidably engaged. The drive belt, driven by said motor, is configured to slidingly move the storage containers along the rails. The robotic assemblies are configured to remove the packages from the slots and deliver them to an interior side of the auto-lock doors.

20 Claims, 26 Drawing Sheets

(56) References Cited

U.S. PATENT DOCUMENTS

| | | | | |
|---|---|---|---|---|
| 5,339,968 A * | 8/1994 | Voelz | A47F 5/0081 | 211/121 |
| 5,344,042 A * | 9/1994 | Crosby | G07F 17/0042 | 221/121 |
| 5,863,172 A * | 1/1999 | Pearson | B65G 1/133 | 198/833 |
| 5,875,434 A * | 2/1999 | Matsuoka | G05B 19/4189 | 700/229 |
| 6,068,156 A * | 5/2000 | Liff | G06V 20/66 | 221/129 |
| 6,688,435 B1 * | 2/2004 | Will | G07F 17/13 | 186/35 |
| 6,854,815 B1 * | 2/2005 | Smith | A47B 49/008 | 211/121 |
| 7,133,743 B2 * | 11/2006 | Tilles | G07F 17/13 | 700/242 |
| 7,564,349 B2 * | 7/2009 | Robey | B65G 1/1373 | 414/331.15 |
| 7,743,930 B2 * | 6/2010 | Krohn | A47F 3/11 | 211/1.51 |
| 7,925,375 B2 * | 4/2011 | Schininger | G07F 11/54 | 700/214 |
| 8,195,328 B2 * | 6/2012 | Mallett | G16H 40/67 | 221/102 |
| 8,392,262 B2 * | 3/2013 | Mallick | G06Q 30/0601 | 705/26.1 |
| 8,423,174 B2 * | 4/2013 | Koch | G06F 17/00 | 700/214 |
| 8,639,578 B2 * | 1/2014 | Barber | G06Q 30/06 | 705/26.1 |
| 8,731,708 B2 * | 5/2014 | Shakes | G06Q 10/087 | 700/216 |
| 9,044,106 B1 * | 6/2015 | Smith | A47F 3/06 | |
| 9,045,923 B2 * | 6/2015 | Krawczyk | E05C 19/166 | |
| 9,120,624 B1 * | 9/2015 | Cassady | G06Q 10/0836 | |
| 9,224,137 B1 * | 12/2015 | Tomasi | H02K 7/14 | |
| 9,230,230 B2 * | 1/2016 | Gupta | G07F 17/13 | |
| 9,428,336 B2 * | 8/2016 | Hagen | B65G 1/0407 | |
| 9,443,370 B2 * | 9/2016 | Carson | G07F 17/0092 | |
| 9,520,012 B2 * | 12/2016 | Stiernagle | G07F 11/165 | |
| 9,569,912 B2 * | 2/2017 | Faes | G07F 11/1657 | |
| 9,796,527 B1 * | 10/2017 | Kaukl | B65G 1/0492 | |
| 9,811,784 B2 * | 11/2017 | Wan | G07F 17/13 | |
| 9,932,170 B2 * | 4/2018 | Munholland | B65D 90/0073 | |
| 9,972,046 B2 * | 5/2018 | Ackerman | G06Q 30/0641 | |
| 10,096,183 B2 * | 10/2018 | Nitu | G07C 9/00912 | |
| 10,192,189 B2 * | 1/2019 | Bhatt | G06Q 10/08355 | |
| 10,235,650 B2 * | 3/2019 | Wan | G06Q 10/087 | |
| 10,273,085 B2 * | 4/2019 | Battles | B65G 63/002 | |
| 10,293,488 B2 * | 5/2019 | Hall | B25J 11/008 | |
| 10,526,142 B2 * | 1/2020 | Jin | G07F 11/62 | |
| 10,613,533 B1 * | 4/2020 | Payson | G05D 1/0088 | |
| 10,625,305 B2 * | 4/2020 | Wagner | B07C 3/14 | |
| 10,676,279 B1 * | 6/2020 | Bidram | A01G 9/143 | |
| 10,676,299 B2 * | 6/2020 | Lawlor | B65G 47/91 | |
| 10,696,480 B2 * | 6/2020 | Mahadevan | B65G 1/133 | |
| 10,846,675 B1 * | 11/2020 | Smith | G07F 17/12 | |
| 10,863,867 B2 * | 12/2020 | Lopez | A47J 47/01 | |
| 10,913,603 B1 * | 2/2021 | Kalm | G05B 19/418 | |
| 11,046,518 B2 * | 6/2021 | Arase | B25J 19/021 | |
| 11,577,401 B2 * | 2/2023 | Sinnet | B25J 9/08 | |
| 2002/0116289 A1 * | 8/2002 | Yang | G06Q 10/08 | 705/26.81 |
| 2002/0177922 A1 * | 11/2002 | Bloom | G07C 9/21 | 700/216 |
| 2006/0045674 A1 * | 3/2006 | Craven | B65G 1/02 | 414/277 |
| 2008/0128444 A1 * | 6/2008 | Schininger | E05G 1/06 | 221/12 |
| 2010/0057871 A1 * | 3/2010 | Kaplan | G07F 9/026 | 709/219 |
| 2011/0313811 A1 * | 12/2011 | Urban | G06Q 20/203 | 296/24.3 |
| 2015/0106296 A1 * | 4/2015 | Robinson | G06Q 10/0838 | 705/339 |
| 2015/0305498 A1 * | 10/2015 | Sue | B65G 1/02 | 211/60.1 |
| 2016/0206132 A1 * | 7/2016 | Chen | B01F 35/712 | |
| 2017/0150843 A1 * | 6/2017 | Rosalia | A47J 27/13 | |
| 2018/0215534 A1 * | 8/2018 | Munholland | B65G 17/485 | |
| 2018/0265296 A1 * | 9/2018 | Beckman | B64U 70/90 | |
| 2021/0008597 A1 * | 1/2021 | Grupp | G06Q 10/08 | |
| 2021/0032031 A1 * | 2/2021 | Kalouche | B25J 9/1689 | |
| 2021/0122621 A1 * | 4/2021 | Goncalves | B60L 1/003 | |
| 2021/0323800 A1 * | 10/2021 | Liu | G06Q 10/087 | |
| 2022/0032467 A1 * | 2/2022 | Odhner | G05B 19/4155 | |
| 2022/0081216 A1 * | 3/2022 | Johnson | B25J 9/161 | |

* cited by examiner

AUTOMATED PACKAGE DELIVERY DEVICES, MACHINES, AND SYSTEMS

CROSS-REFERENCE TO RELATED APPLICATIONS

This Application is a Continuation in Part of U.S. Utility Non-Provisional patent application Ser. No. 17/150,436, which was filed on Jan. 15, 2021, entitled AUTOMATED PACKAGE DELIVERY DEVICES, MACHINES, AND SYSTEMS, the contents of which are incorporated herein by this reference as though set forth in their entirety, and to which priority is claimed.

FIELD OF USE

The present disclosure relates generally to automated equipment, and more particularly to automated package delivery devices, machines, and systems that is centrally located, accepts incoming packages and then automatically delivers them to customers who travel to pick up their specific package.

BACKGROUND

Last mile is a term used in transportation planning and supply chain management to describe the movement of goods from one or more hubs/warehouses to a final delivery destination. In supply chain management and delivery logistics, the "last mile" describes the difficulty in transporting packages from the hubs to the consumer that ordered the goods. Since the explosion of online ordering and the rise of massive online retail stores, last mile delivery is an increasingly studied field as the number of business to consumer (b2c) deliveries grow. Some of the challenges of last mile delivery include minimizing cost, ensuring transparency, increasing efficiency, and improving infrastructure.

One last mile solution is to deliver all of the packages destined for one specific geographic area to a central hub and then allow the customers to come and pick up the packages. This model is similar to the Post Office Box model. Currently, there are numerous types of pick-up hubs that attempt to overcome the last mile problem. These include mostly manual facilities and somewhat automated kiosks. The current semi-automated kiosks have significant limitations, such as being too small, and thus containing a very limited number of packages, and being only partially automated. Another limitation with the kiosk package locker models in use before the present disclosure is that each locker can only contain one customer's package(s). Thus, the capacity is limited to the number of lockers that are in each semi-automated kiosk. Currently, this means that only about 50 customers can be serviced at a time in a semi-automated kiosk.

U.S. Pat. No. 10,273,085 discloses a mobile automated package delivery system that is made up of several stacked horizontal carriers. This Patent also discloses non-movable robotic manipulators for automatically removing packages from the bins on the carriers. This patent is deficient because it does not disclose vertical carriers with multiple compartments in each stacked row, and the robotic arms are not mobile.

U.S. Pat. No. 10,613,533 discloses an autonomous delivery and retrieval system that uses automatically locking doors. This patent is deficient because it has horizontal carriers and static robotic arms. This patent is deficient because it does not disclose vertical carriers with multiple compartments in each stacked row, and the robotic arms are not mobile.

U.S. Patent Application Publication No. 2021/0032031 discloses a storage grid system with partitioned storage container. This patent is deficient because it does not disclose vertical carriers with multiple compartments (with an open front) in each stacked row, and the robotic arms are not horizontally movable along the sides of the containers.

U.S. Pat. No. 6,694,217 discloses an automated system for storage and self-service retrieval. This patent is deficient because it does not disclose a mobile robotic arm for retrieval of the packages, and it requires there to be multiple retrieval doors in order to get packages from all of the containers in each horizontal row.

Thus, what is needed is a fully automated package delivery device and system wherein the has a significant increase in capacity and wherein each storage cabinet may contain packages related to several different customers.

SUMMARY

The following presents a simplified overview of the example embodiments in order to provide a basic understanding of some embodiments of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented hereinbelow. It is to be understood that both the following general description and the following detailed description are exemplary and explanatory only and are not restrictive.

In accordance with the embodiments disclosed herein, the present disclosure is directed to automated package delivery machines, kiosks, hubs, devices, and systems.

The package delivery hub, device, and system may comprise a housing that is located in an easily accessible space, public or private, wherein the company or companies delivering packages have access to loading packages into the machine, but customer's and members of the public have no access other than to receive their package that is automatically delivered to them by the machine.

The automated package delivery machine may comprise a housing, one or more carousels, one or more robotic assemblies, one or more roller ramps, and one or more auto-lock doors. The carousels may be side by side or stacked. The carousels may comprise rails, which may be configured as a loop. The carousels may also comprise a plurality of storage containers that slidingly engage with the rails, such that they may be moved from loading positions, to unloading positions, and to storage positions. The storage containers may be moved by an encircling belt that is driven by a motor, gear, and belt assembly. The robotic assemblies are configured and programmed to move the packages within the storage containers to the roller ramps, which funnel the packages to the auto-lock doors, which are opened only for the appropriate customer.

The automated machine and system of the present disclosure may have a housing that is strong and substantially prevents unwanted access.

The carousels may be positioned to be horizontal, vertical, or any diagonal in-between, depending on the shape of the housing and regardless of whether the automated machine and system is inside or outside of another structure.

The automated machine and system of the present disclosure may be mobile, or it may be substantially stationary. The automated package delivery system may be located in a publicly accessible location that does not require the user to access private property to reach.

The automated machine and system of the present disclosure may allow access to one, two, or more transportation/delivery companies. If for one company, the machine may act as a centralized shipping location to which numerous customers of the single company in a single area may select to have their packages shipped. If for two or more companies, the machine may act as a quasi-public shipping location to which numerous customers of all of the participating companies may select to have their packages shipped. In this manner, the small companies agreeing to use the automated package delivery machine as a shipping location may be on equal footing with large box stores that can offer reduced cost shipping and/or pick up at a store that is close to any particular customer.

One embodiment may be an automated an automated package delivery machine, comprising: a housing with one or more auto-lock doors; one or more carousels; and one or more robotic assemblies; wherein said housing substantially encloses said one or more carousels and said one or more robotic assemblies, and substantially prevents unwanted access to an interior of said housing; wherein each of said one or more carousels comprises a plurality of storage containers, a drive belt, a motor, and one or more rails; wherein each of said plurality of storage containers comprises a plurality of slots; wherein each of the plurality of slots are configured to accept and contain one or more packages to be delivered to one or more customers; wherein the one or more rails form a loop track to which the plurality of storage containers are slidably engaged; wherein the drive belt, driven by the motor, is configured to slidingly move the plurality of storage containers along the one or more rails; and wherein the one or more robotic assemblies are configured to remove the one or more packages from the plurality of slots and deliver the one or more packages to an interior side of the one or more auto-lock doors. The automated package delivery machine may further comprise a central access display that is configured to be engaged with by the one or more customers to have the one or more packages from the automated package delivery machine delivered to the one or more users. The housing is configured to provide access to one or more deliver persons to load the one or more packages into the plurality of storage containers. The one or more auto-lock doors may be configured to unlock automatically so the one or more customers may retrieve the one or more packages from the automated package delivery machine. In other embodiments, the auto-lock door may be opened automatically, not just unlocked automatically. The automated package delivery machine may be substantially a permanent installation or substantially a mobile installation. Preferably, the automated package delivery machine may be in a publicly accessible location. The automated package delivery machine may further comprise one or more roller ramps that may be located, respectively, between the one or more robotic assemblies and the one or more auto-lock doors, such that the one or more robotic assemblies may deliver the one or more packages to the one or more roller ramps, which slidingly move the one or more packages to the interior side of the one or more auto-lock doors. the plurality of slots in each of the plurality of storage containers may be formed by a slot grid. The slot grid may be adjustable so that one or more larger packages may be loaded into the one or more storage container.

The robotic assemblies may be configured to either pull (as shown in the Figures) or push the package items out of the containers/slots.

In one embodiment, there are no roller ramps. Instead, a simple low friction slide/ramp may be used. Alternatively, the robotic assemblies may stay well on the inside of the auto-pickup machine and the carousel may move the containers to the position of the robotic assemblies to open a small door that corresponds to the slot, then move the container with the open slot to the auto-lock door so that user can physically remove the item/s in the slots. In this embodiment, the slide or roller ramps are not included.

Still other advantages, embodiments, and features of the subject disclosure will become readily apparent to those of ordinary skill in the art from the following description wherein there is shown and described a preferred embodiment of the present disclosure, simply by way of illustration of one of the best modes best suited to carry out the subject disclosure As it will be realized, the present disclosure is capable of other different embodiments and its several details are capable of modifications in various obvious embodiments all without departing from, or limiting, the scope herein. Accordingly, the drawings and descriptions will be regarded as illustrative in nature and not as restrictive.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF ILLUSTRATIVE EMBODIMENTS

Figure 1:
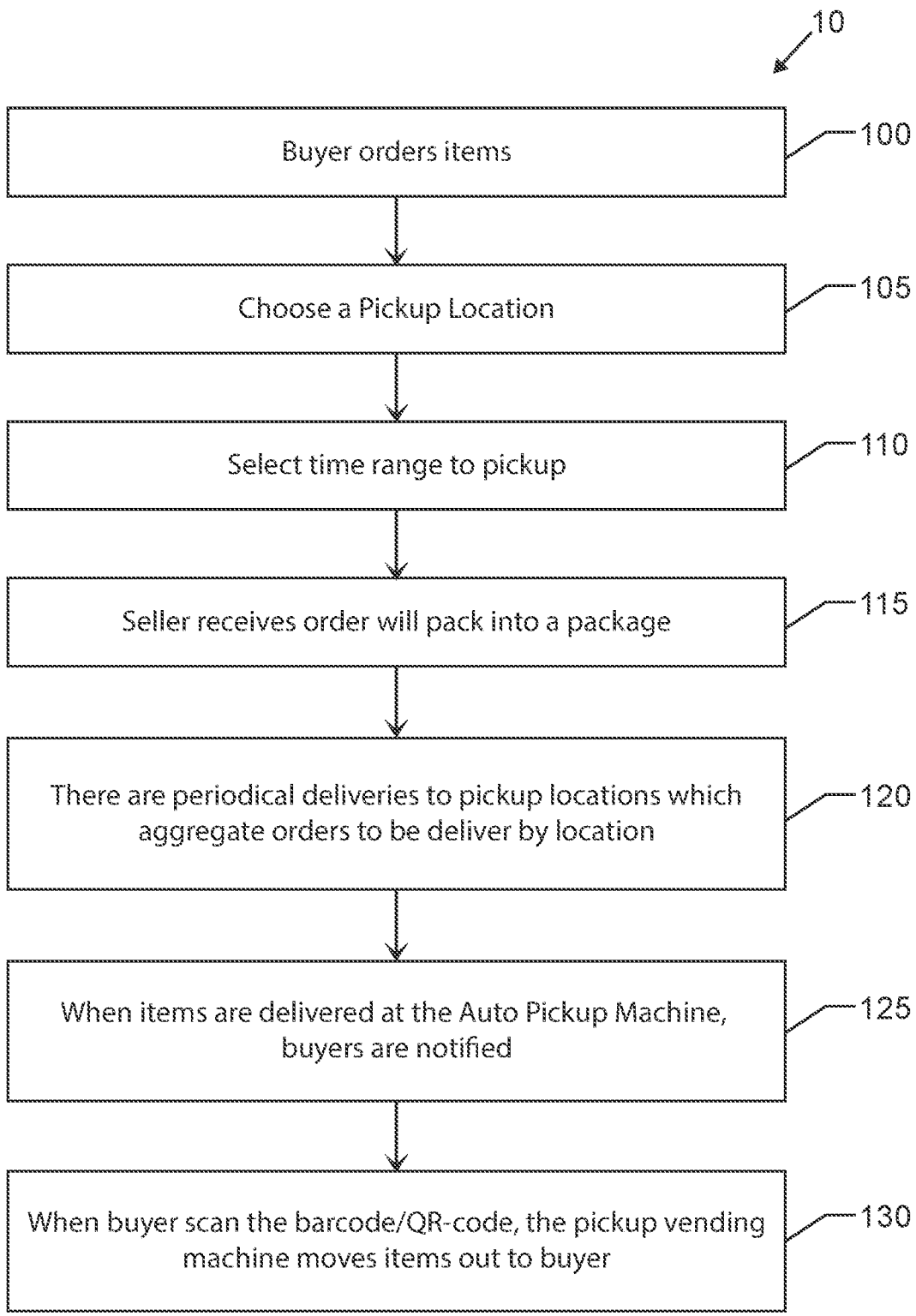
FIG. 1 is a flow block diagram showing a method of using the device and system of the present disclosure.

In the following detailed description of various embodiments, numerous specific details are set forth in order to provide a thorough understanding of various aspects of one or more embodiments. However, the one or more embodiments may be practiced without some or all of these specific details. In other instances, well-known methods, procedures, and/or components have not been described in detail so as not to unnecessarily obscure aspects of embodiments.

While multiple embodiments are disclosed, still other embodiments of the present disclosure will become apparent to those skilled in the art from the following detailed description, which shows and describes illustrative embodiments. As will be realized, the embodiments are capable of modifications in various obvious aspects, all without departing from the spirit and scope of the present disclosure. Accordingly, the graphs, figures, and the detailed descriptions thereof, are to be regarded as illustrative in nature and not restrictive. Also, the reference or non-reference to a particular embodiment shall not be interpreted to limit the scope.

Before the embodiments are disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 5% of the indicated number or range of numbers. In one embodiment, the term "approximately" and "about", may refer to a deviance of between 0.001-10% from the indicated number or range of numbers.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are signify both in relation to the other endpoint, and independently of the other endpoint.

"Optional" or "optionally" means that the subsequently described event or circumstance may or may not occur, and that the description includes instances where the event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all embodiments of this application including, but not limited to, steps in disclosed methods. Thus, if there are a variety of additional steps that may be performed it is understood that each of these additional steps may be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware embodiments. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

FIG. 1 is a flow block diagram showing a method of using the device and system of the present disclosure. FIG. 1 shows that the method 10 may comprise the steps of a customer or buyer ordering one or more products 100, typically via an online purchase. As part of the order, the user selects to have the product delivered to an automated package delivery machine location 105. The user may select this option because the shipping charges would be substantially less than having the products shipped directly to the customer's home or business. Optionally, the user may select a specific day, time, and or range to have the package be available for retrieval 110. The seller may then process the order and prepare for it to be shipped to the automated package delivery machine location 115. To save even more in shipping, the company or shipping company may consolidate orders to be picked up periodically for specific locations of the automated package delivery machine location 120. After the customer's products are delivered to the automated package delivery machine location, the customer is notified 125, typically via email, text, or phone. The buyer then travels to the automated package delivery machine location, interacts with the machine, and has the package(s) delivered automatically 130. The user typically scans a QR code or punches in a code or password at an interface on the outside of the machine. This confirms to the machine which package is to be delivered to the customer. Preferably, the package is delivered to the customer automatically. The package is taken out of the storage container, which may or may not contain additional packages, selected by an automated mechanism, such as a robotic arm and then moved to an external portal of the machine.

Figure 2:
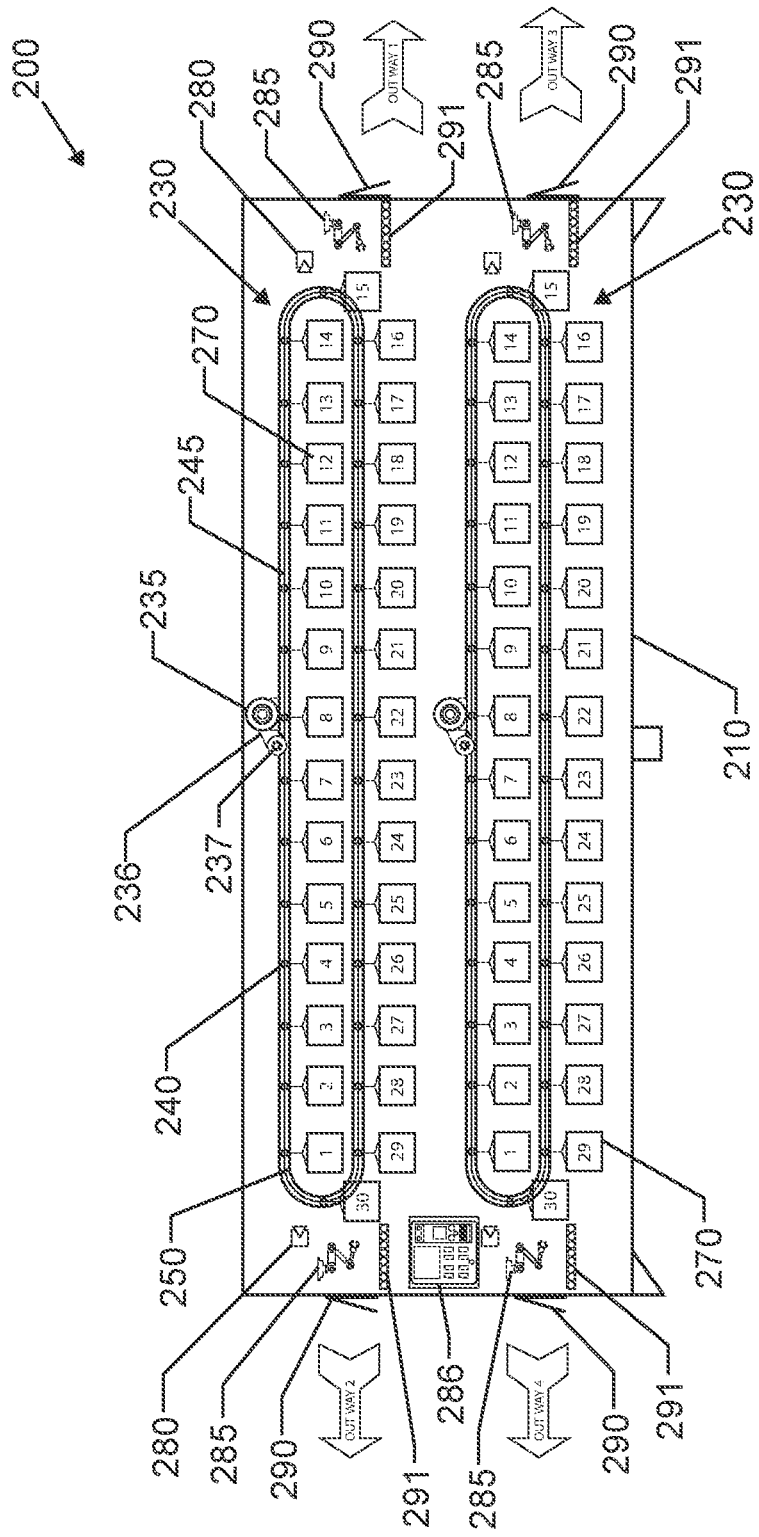
FIG. 2 is an illustration of one embodiment of the automated package delivery machine of the present disclosure.

FIG. 2 is an illustration of one embodiment of the automated package delivery machine of the present disclosure. As shown in FIG. 2, the automated package delivery machine 200 may be a permanent, quasi permanent, or moveable package storage hub that is configured to contain packages whose final destination is within the nearby area. The automated package delivery machine 200 may comprise a cover or housing 210, which may have one or more doors or package input locations that allow one or more delivery companies or persons to access the automated package delivery machine 200 and place incoming packages into the storage containers or goods crates 270. In some embodiments, the cover 210 may be large enough to allow the delivery person to enter into the housing in order to load in packages to be delivered. Preferably, the delivery person manually or wirelessly engages with the automated package delivery machine 200 so that the automated package delivery machine 200 knows in which storage container the package was loaded.

The customers may engage with a central access system or display 286 that may be part of or attached to the cover 210. Typically, the user may have a QR or barcode on paper or mobile device that is scanned by the central access display 286. Alternatively, the user may punch in a code, tap, insert a chipped card, swipe a card, or use a near field wireless communication (and the like) to alert the machine 200 that a customer is next to the machine and is ready to retrieve a package. After scanning, swiping, tapping, inserting, touching, punching in, touchlessly communicating, and/or linking, the automated package delivery machine 200 automatically moves the storage container 270 that contains that customer's package(s) so that the customer's package(s) can be automatically delivered to the customer. The cover 210 may also house the auto-locked doors 290, which are locked unless providing access to a customer who then immediately removes a delivered package.

The central access display 286 may also comprise or may be connected to a local electronic data processing unit that is configured to provide local data processing to the machine 200. Preferably, the machine 200 is wirelessly connected, and/or has a wired connection, to a control server/cloud, which provides secure control and programming to the machine 200. In some embodiments, the control server/cloud acts as a controller for numerous machines 200. The control server/cloud and/or local data processing unit may provide the programming necessary to allow the delivery persons to appropriately load the packages into the storage containers 270, such that the machine 200 is able to automatically move the storage container to an unload location next to one of the robotic assemblies 285. The control server/cloud and/or local data processing unit may provide the programming necessary to allow the robotic assemblies 285 to move any specific package from the storage container to the appropriate auto-lock door 290. The auto pickup machine may be controlled by a simple embedded system programmed with PLC (Programmable Logic Controller) with a network interface card (NIC) or a wireless communication driver.

Within the housing, the automated package delivery machine 200 may comprise, one, two, or more carousels 230, which may comprise a plurality of storage containers 270, side rails 250, chain or belt 245, bearings 240, motor 235, timing belt or chain 236, and gear or pulley 237. Although other mechanisms can be used the carousels 230 provide a preferred, compact, and reliable way to store the packages while they away final delivery and an efficient way to move the packages into position for final delivery. As shown in FIG. 2, the storage containers 270 may be moveably engaged with the rails 250 and the bearings 240, such that they are pulled along the oblong path of the rails 250 by the belt 245. The belt is driven by the motor gear 237, which itself is driven by motor 235 and timing belt 236. Other powered mechanisms may be used so long as the storage containers 270 are moved along the rails 250. The motor 235 may be any kind of motor including gas, electric, brushless, and the like. Carousels 230 are configured to move any particular storage container 270 near one of the four or more robotic assemblies 285, which are configured to unload the packages from the storage containers 270 and deliver the packages next to the auto-locked doors 290. In one embodiment, the robotic assemblies 285 may be articulating robotic arms or a grid/slider based robotic system. In one embodiment, the robotic assemblies 285 may place the being delivered packages on a roller ramp 291 or a conveyor belt, which may slide or move the packages to being just inside the auto-locked doors 290. The packages may be removed from the storage container 270 by the robotic assembly 285 in several different ways, including, but not limited to: pushing/piston, vacuum, suction, and/or a claw. In one embodiment the package may be scanned at barcode 280 to ensure that the package picked up by the robotic assembly 285 is the correct one. This final scan may be a way for the system to confirm delivery of the correct package to the correct customer.

Figure 3:
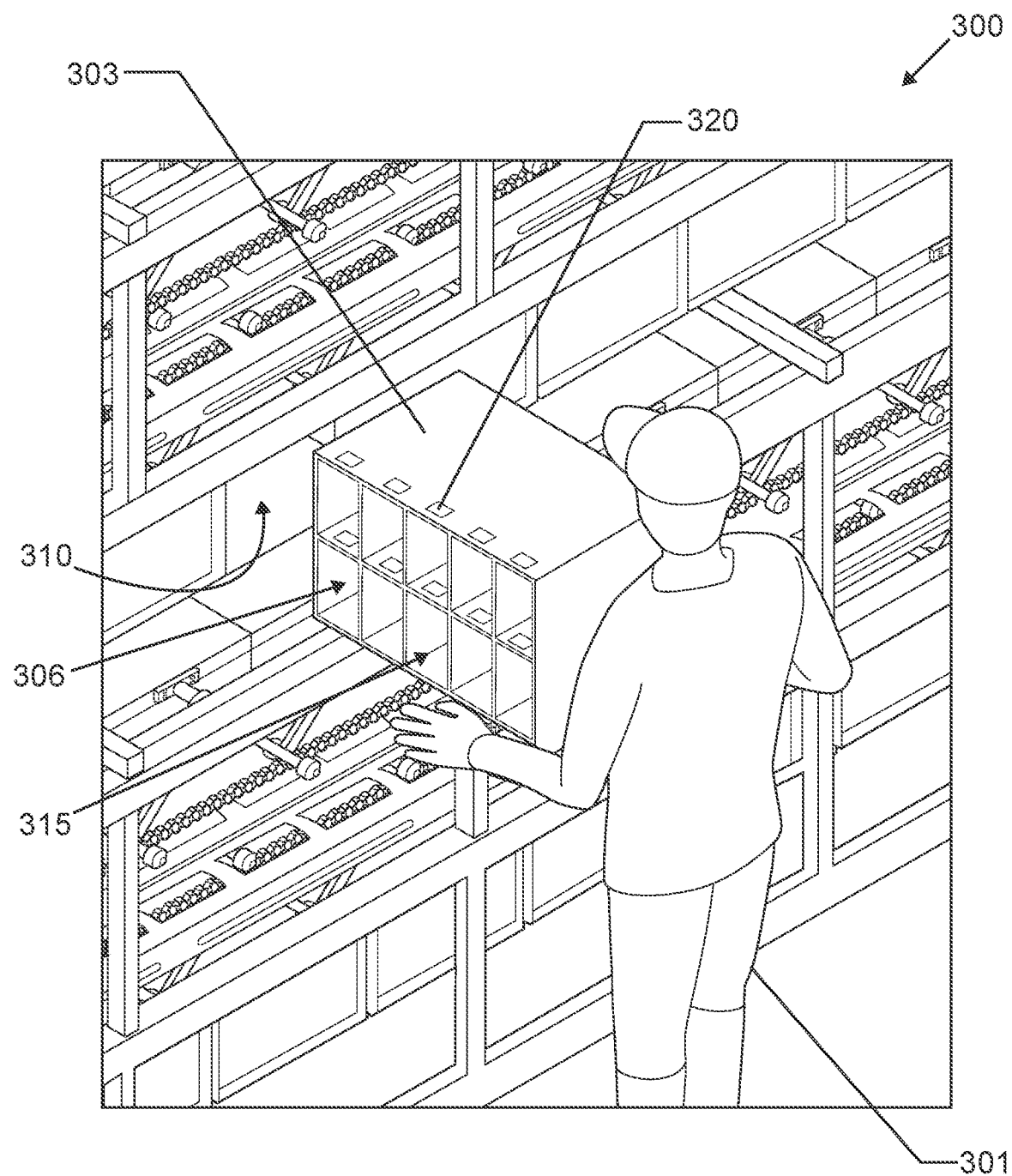
FIG. 3 is an illustration of one embodiment of a storage container that is part of the automated package delivery machine.

FIG. 3 is an illustration of one embodiment of a storage container that is part of the automated package delivery machine. FIG. 3 shows that automated package delivery machine 300 may be loaded with packages by a delivery person 301. The packages may be loaded into one or more storage containers 305, which may have one or more package slots 306. The storage containers 305 may be removed, fully, or partially, from storage container slots or frames 310, which allows one or more packages to be loaded into the one or more package slots 306. In one embodiment, the storage containers may be flexible regarding how many packages may be loaded. Specifically, if the package to be delivered is very large, the package may take up multiple package slots. This may be done by having the package slot grid 315 (which forms the package slots 306) be moveable, adjustable, collapsible, or entirely removeable. Preferably, the delivery person 301 may identify what package is going into what slot 306 of what storage container 305. This may be done in many ways, which includes scanning the slot identifier 320 when the package is loaded. The automated package delivery machine 300 knows in which slot 306 each package is loaded. This allows the automated package delivery machine 200 to move the correct container 305 into the correct position to allow one of the robotic assemblies to engage with the correct package and deliver it to the correct customer.

Figure 4:
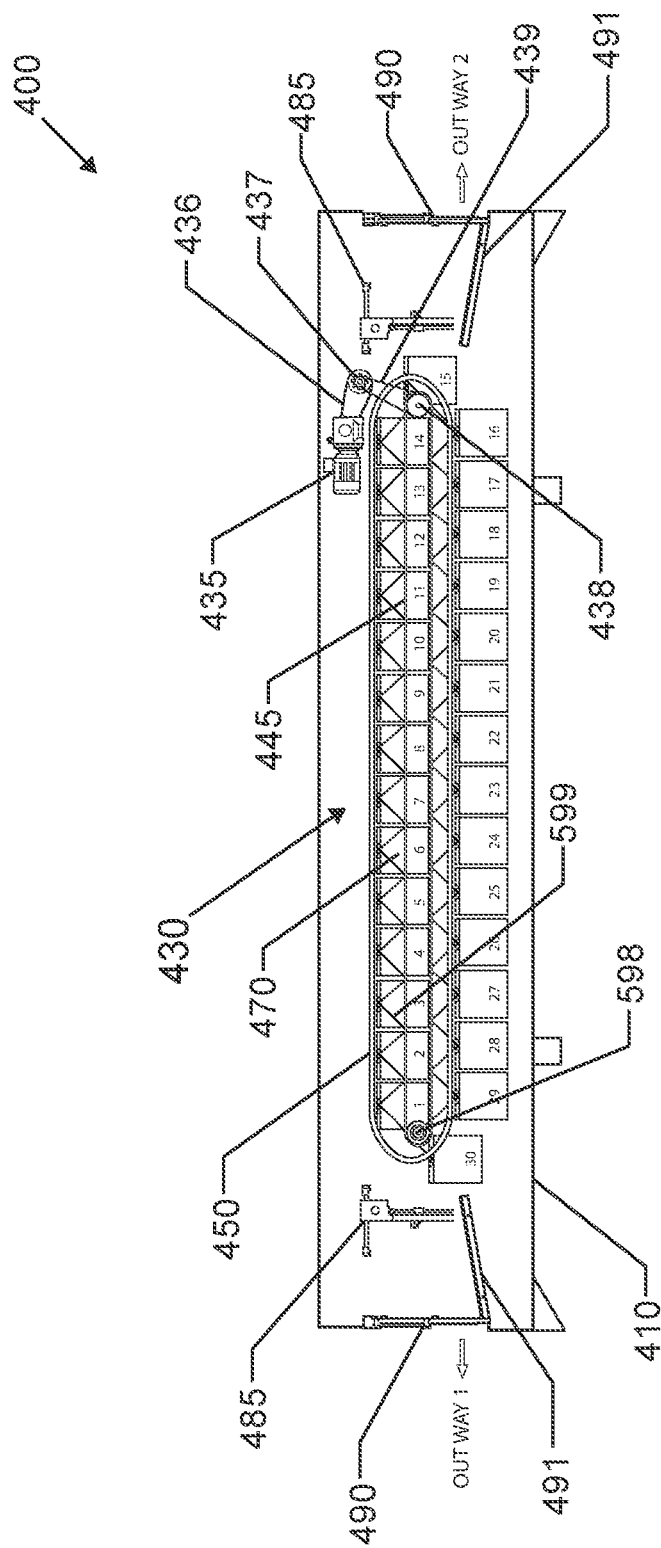
FIG. 4 is an illustration of another embodiment of the automated package delivery machine of the present disclosure.

FIG. 4 is an illustration of another embodiment of the automated package delivery machine of the present disclosure. As shown in FIG. 4, one embodiment of the automated package delivery machine 400 may comprise a single carousel 430 within housing 410. As shown the housing may have two auto-lock access doors 490, which allows customers to retrieve packages. The auto-lock doors 490 may be at the end of roller ramps 491, which allows the packages to slide down and be just on the inside of the auto-lock doors, ready for retrieval by the customer. The robotic assemblies 485 are configured to remove packages from the storage containers 470 and deliver them to the customers. As shown in FIG. 4, the robotic assemblies may be a sliding arm grid robotic device that aligns a picking arm with the package to be delivered. In other embodiments there may be a piston that pushes the package out of the container slot. The picking arm engages the package and then the sliding arm grid robotic device places it at the start of the roller ramp 491, which then uses gravity to funnel/roll the package down to the auto-lock access door 491. In other embodiments, the robotic assembly may be an articulating arm, crane, drone, suspended wire rig, or any other type of robotic mechanism that can transport the package to be delivered to the customer. In one embodiment, the picking arm has a suction or vacuum device that allows the picking arm to securely grasp the package and move it into position for final delivery. In another embodiment, the picking arm may use refreshable adhesives to engage the packages. In another embodiment, the picking arm may us a claw or clamp to physically grasp the package.

Carousel 430 is configured to move the storage containers into a position for engagement by the robotic assemblies 485. As shown in FIG. 4, the carousel 430 may comprise a set of rails 450, which may form an oblong looped track, along which the storage containers 470 may slide. Typically, the storage containers 470 may engage the rails 450 via a wheeled or bearing engagement mechanism. The storage containers 470 may be moved slidingly along the rails 450 by a drive belt 445, which may be a metal chain or a rubber belt, which runs along the horizontal length of the machine 400 between the end gear 598 and the belt drive gear 438. The drive belt 445 may be an articulating link chain that is connected to drive belt connectors 599, which may also engage with each of the storage containers 470. In this manner, as the drive belt 445 moves, the storage containers slidingly move as well along the rails 450 in an oblong loop. The drive belt 445 may also be a notched rubber or plastic drive belt. The drive belt 445 may be connected to a belt drive gear 438, which may be connected to a pulley belt 439, which may be connected to timing gear 437, which may be connected to timing belt 436, which may be connected to high powered motor 435. The motor 435 may be controlled by the automated package delivery machine 400 such that it starts and stops in order to move the storage containers 470 into a position to automatically load and deliver/unload packages. The system of gears 438, 437, 598 and belts 436, 439 are configured to allow the appropriate torque to be provided to the drive belt 445 in order to smoothly and automatically move the storage containers 470 along the rails 450.

Figure 5:
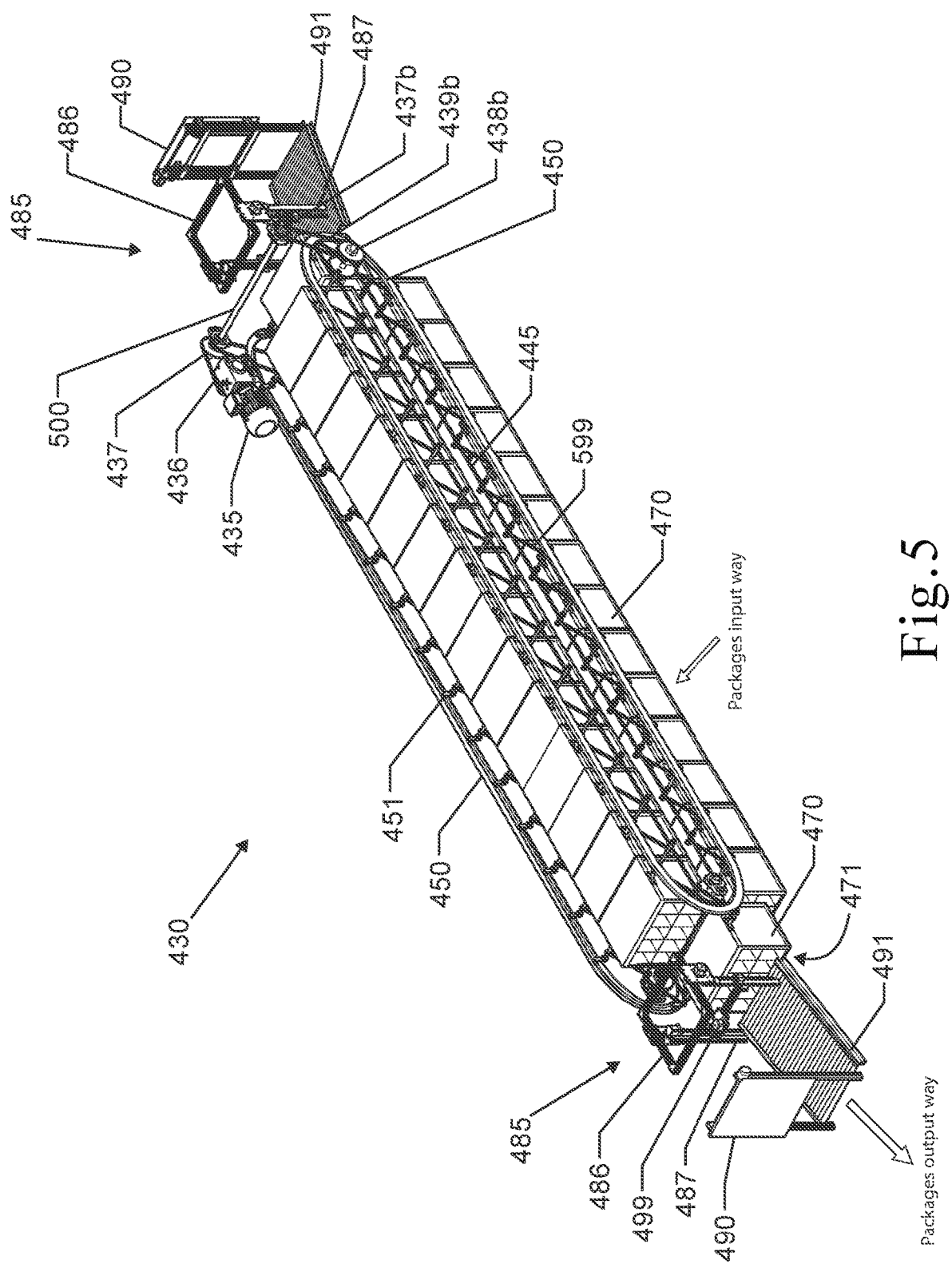
FIG. 5 is an illustration of one embodiment of the automated package delivery system.

FIG. 5 is an illustration of one embodiment of the automated package delivery system. FIG. 5 shows that the carousels 430 may comprise two rails 450 from which storage containers 470 may be suspended. FIG. 5 shows that the storage containers 470 may comprise a plurality of slots 471 and rail/container connectors 451, which is how the containers 470 may slidingly connect to the rails 450. FIG. 5 also shows that the carousel drive system may comprise a drive shaft 500, which may interconnect the main gears 438, 437 and belts 436, 439 with a reciprocal set of gears 438*b*, 437*b* and pulley belt 439*b*.

Preferably, there are two drive belts 445, one on each side of the carousel 430. These drive belts 445 are both powered by the motor 435, such that the storage containers 470 are pulled smoothly along the rails 450.

FIG. 5 shows that the storage containers 470 may be accessed when they are on the bottom portion of the rail loop of the carousel 430.

FIG. 5 shows one embodiment of the robotic assemblies 485 that may be used to move the packages from the storage containers 470 to the roller ramp 491. Once the package slides down the roller ramp 491, the auto-lock door 490 may open, as shown, so that the customer may retrieve the automatically delivered package. As shown, the robotic assemblies 485 may be grid/slider based robotic assembly that may comprise a horizontal portion 486, a vertical portion 487, and a picker arm 499. Once the vertical portion 487 and horizontal portion 486 position the picker arm 499 in front of the correct slot 471, the picker arm 499, via its programming, automatically engages with the package in the correct slot 471 and moves the package to the inside of door 490.

Figure 6:
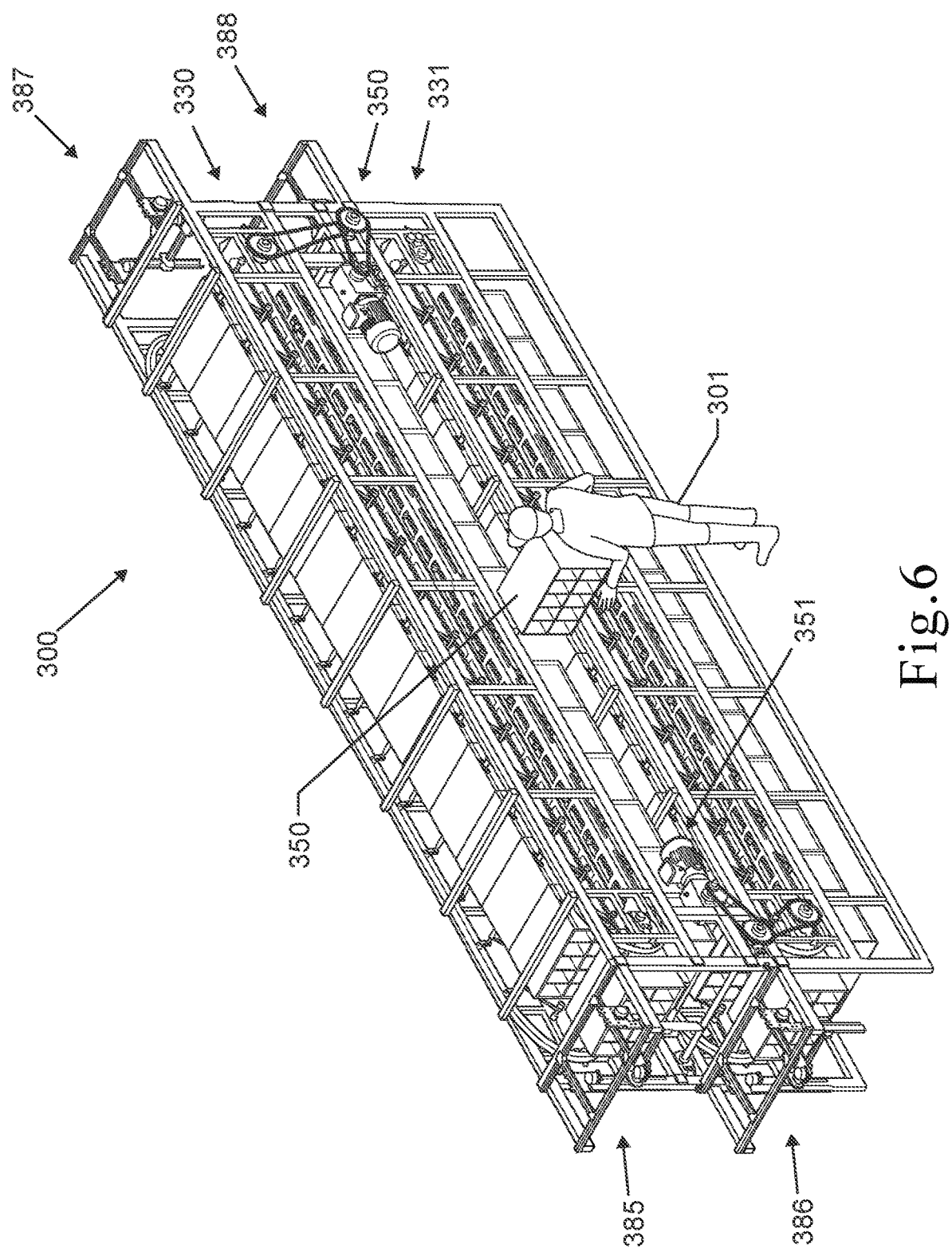
FIG. 6 is an illustration of another embodiment of the automated package delivery system.

FIG. 6 is an illustration of another embodiment of the automated package delivery system. As shown in FIG. 6, the automated package delivery machine 300 may be loaded with packages by a delivery person 301. The automated package delivery machine 300 may comprise two stacked carousels 330, 331, which each have a motor, gear, belt assembly 350, 351, which move the storage containers around the looped rails of the carousels. Each carousel 330, 331 may have a robotic assembly 385, 386, 387, 388, on each end to remove the packages from the storage containers 305 and output them to a customer.

Figure 7:
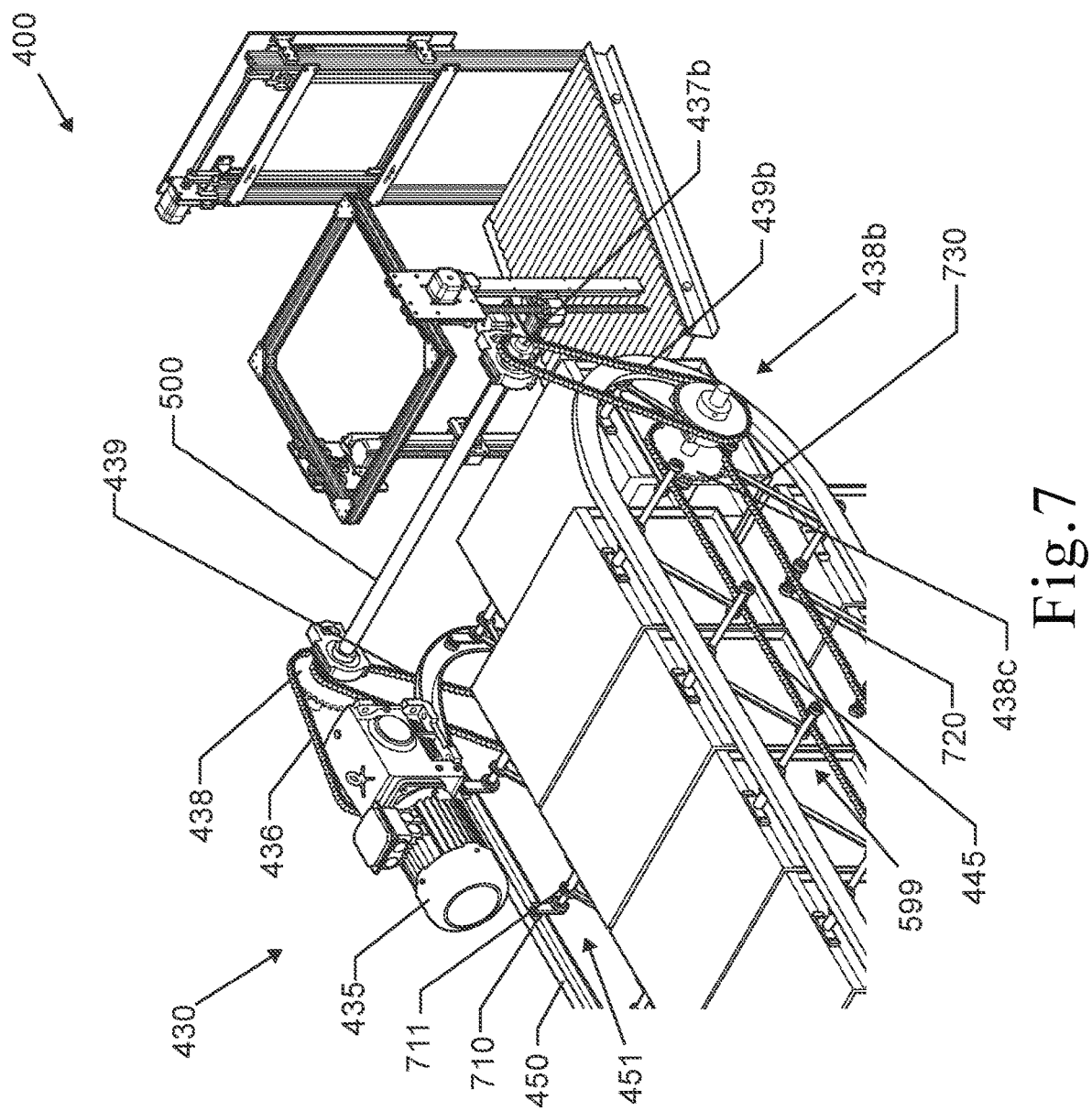
FIG. 7 is an illustration of one portion of one embodiment of the automated package delivery system.

FIG. 7 is an illustration of one portion of one embodiment of the automated package delivery system. As shown in FIG. 7, the carousel 430 may comprise two rails 450 from which storage containers 470 may be engaged and/or suspended. As shown, each of the two rails 450 may be a C-bar, which forms a continuous loop track that partially encloses a plurality of bearing wheels 710, each of which are connected to a rail/container connector 451. As shown, each rail/container connector may comprise a container bar 711, two of which extend horizontally outward from the two sides of each container 470 and connect the storage containers 470 to both the rails 450 and the drive belts 445.

FIG. 7 also shows how the drive belts 445 are powered by motor 435. Motor 435 is connected to timing belt 436, which is connected to and turns timing gear 437, which is connected to drive shaft 500 and pulley belt 439. Pulley belt 439 may then drive belt drive gear 438, which is connected to drive belt 445, which is connected to the rails 450 and, preferably, all of the storage containers 470. In this manner, when the motor 435 is on, the drive belt 445 is driven, forward or backward, such that the storage containers 470 slide, forward or backward, along the rails 450.

The drive shaft 500 is connected to drive belt gear 437*b*, which is connected to pulley belt 439*b*, which is connected to and drives belt drive gear 438*b*, which may comprise and/or be connected to interior belt drive gear 438*c*, which is the actual gear that engages with and turns one of the drive belts 445.

FIG. 7 shows that the drive belt connectors 599 is connected to the container bar 711 and rail/container connector 451, which mean that the drive belt connectors 599 are connected to the storage containers 470 and the rails 450. As shown, the drive belt connectors 599 are also connected to the drive belt 445 via a plurality of drive belt pins 720. In this manner, as the drive belts 445 rotate, the storage containers 470 also rotate along rails 450.

Figure 8:
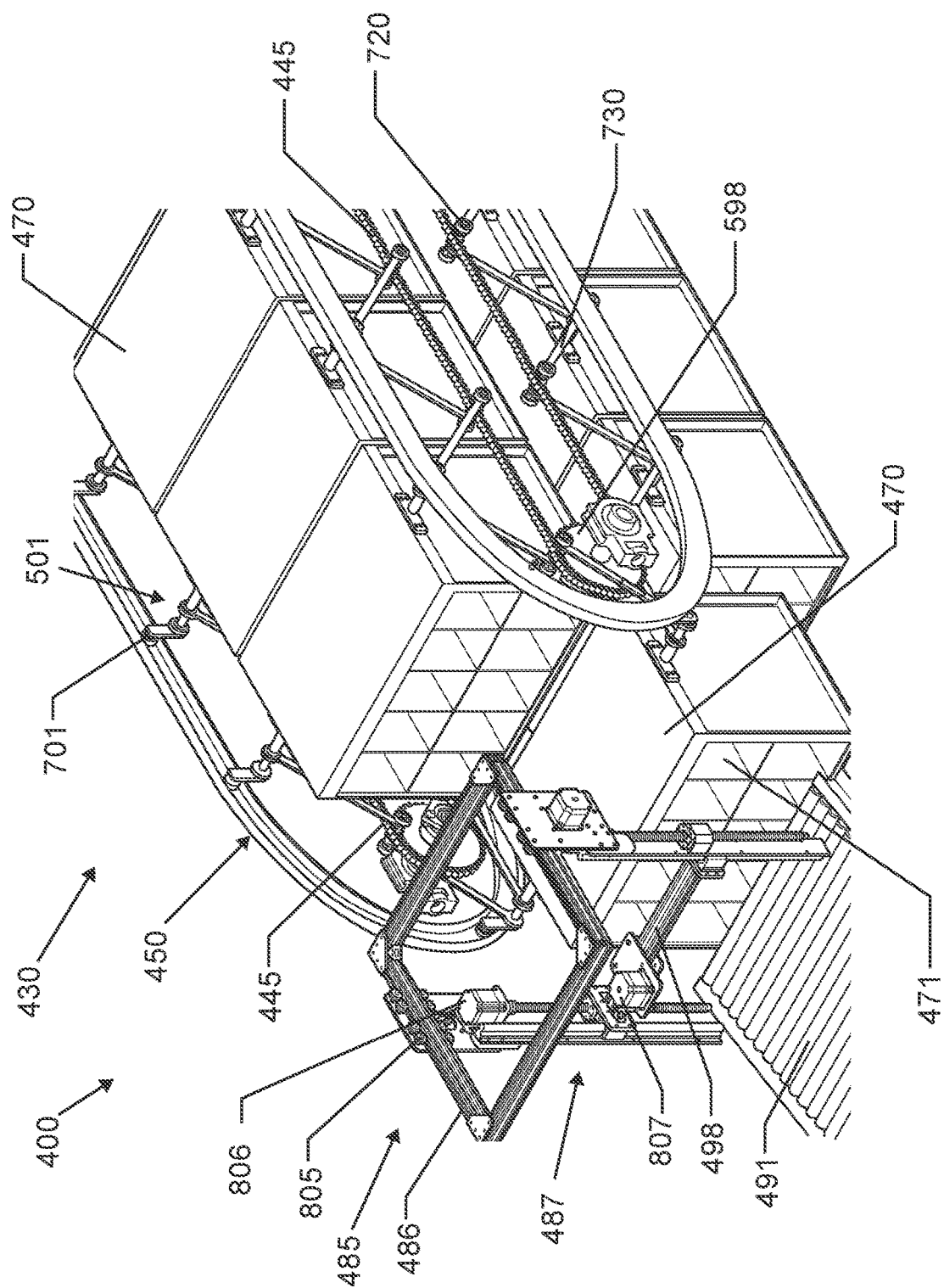
FIG. 8 is an illustration of another portion of one embodiment of the automated package delivery system.

FIG. 8 is an illustration of another portion of one embodiment of the automated package delivery system. FIG. 8 shows that the drive belts 445 may also engage with end gears 598, which may be powered or unpowered.

FIG. 8 also shows that the robotic assembly 485 may comprise horizontal portion 486, vertical portion 487, horizontal picker bar 498, picker arm 499 (not shown in FIG. 8), x-axis actuator 805, y-axis actuator 806, and z-axis actuator 807. The horizontal portion 486 may comprise a frame to which vertical portion 487 hangs from. Vertical portion 487 may move back and forth along the frame of the horizontal portion 486 via the x-axis actuator. This allows the picker arm 499 to get closer to or further away from the slots 471 of the storage containers 470. The horizontal picker bar 498 may be moved up and down the vertical portion 487 via y-axis actuator 806. This allows the robotic assembly 485 to move the picker arm up and down along the height of the storage containers 470 to be placed in front of the correct slot 471 of the storage containers 470. The z-axis actuator 807 is preferably in close proximity to the picker arm 499 and both are configured to run back and forth along the horizontal picker bar 498. This allows the robotic assembly 485 to move the picker arm back and forth along the width of the of the storage containers 470 to be placed in front of the correct slot 471 of the storage containers 470. Once in place in front of the correct slot 471, the picker arm may automatically retrieve the package that is inside of the correct slot 471 and then drop it on the roller ramp 491.

Figure 9:
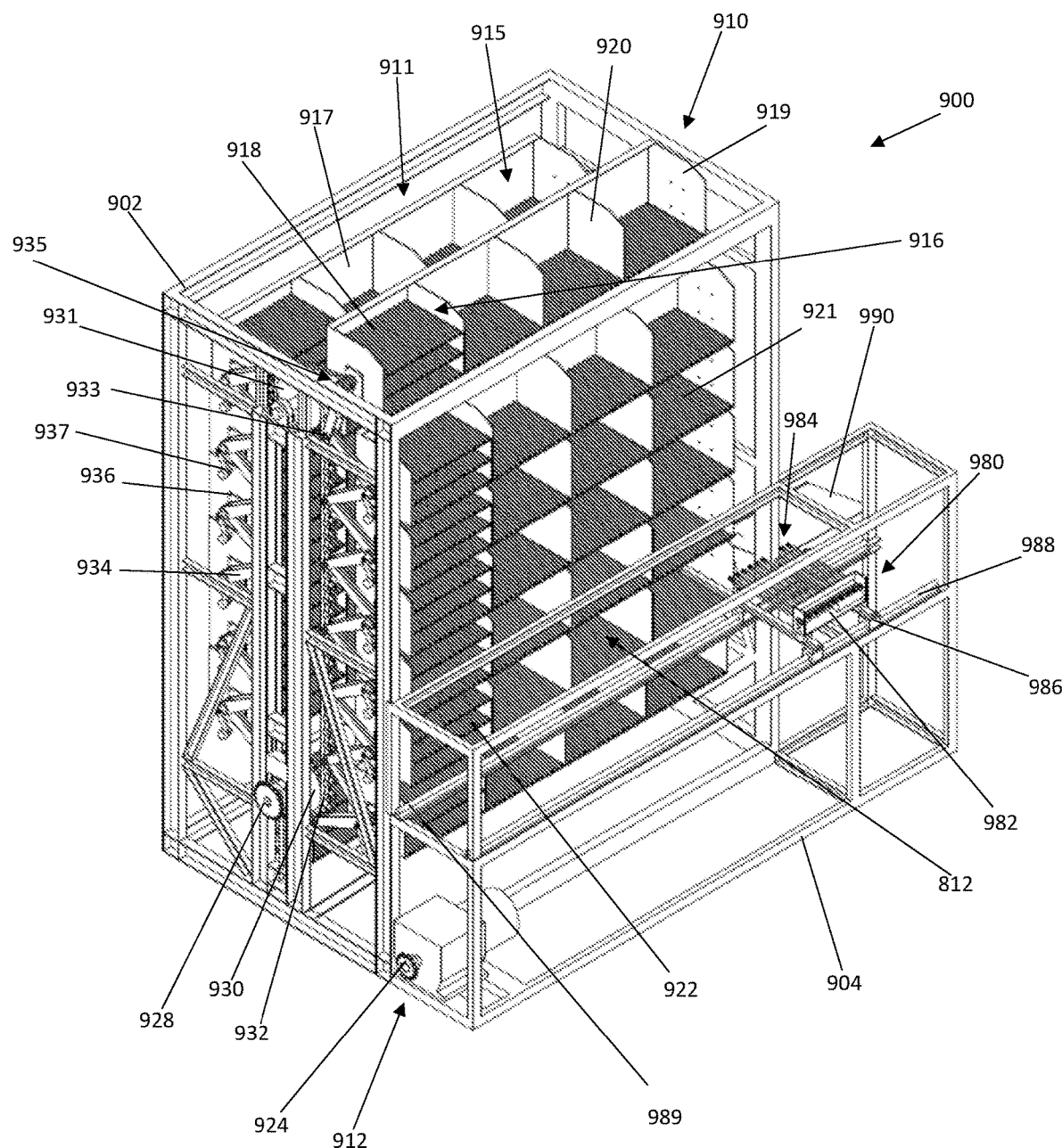
FIG. 9 is an illustration of a perspective view of another embodiment of the automated package storage and delivery system.

FIG. 9 is an illustration of a perspective view of another embodiment of the automated package storage and delivery system. As shown in FIG. 9, one embodiment of the automated package delivery machine 900 may comprise a single vertical carousel 910 within carousel frame 902. As shown, the package delivery machine 900 may have a package delivery portion 990 that allows customers to retrieve packages, preferably through auto-lock doors that may be at the end of ramp, which allows the packages to slide down and be just on the inside of the auto-lock doors, ready for retrieval by the customer.

As shown in FIG. 9, the vertical carousel 910 may comprise a plurality of horizontal rows, such as horizontal row 911, each of which may have a plurality of compartments, such as compartments 812, 915, 916, which are configured to hold one or more packages. The compartments may be divided by dividers, such as divider 920 and end divider 919, may have backing portions, such as backing portion 917, and may have a bottom, such as bottom 921. Some compartments, such as compartment 916, may have one or more stacked shelves, such as shelf 918 and shelf 922, which may optimize the storage and retrieval of smaller packages.

Figure 12:
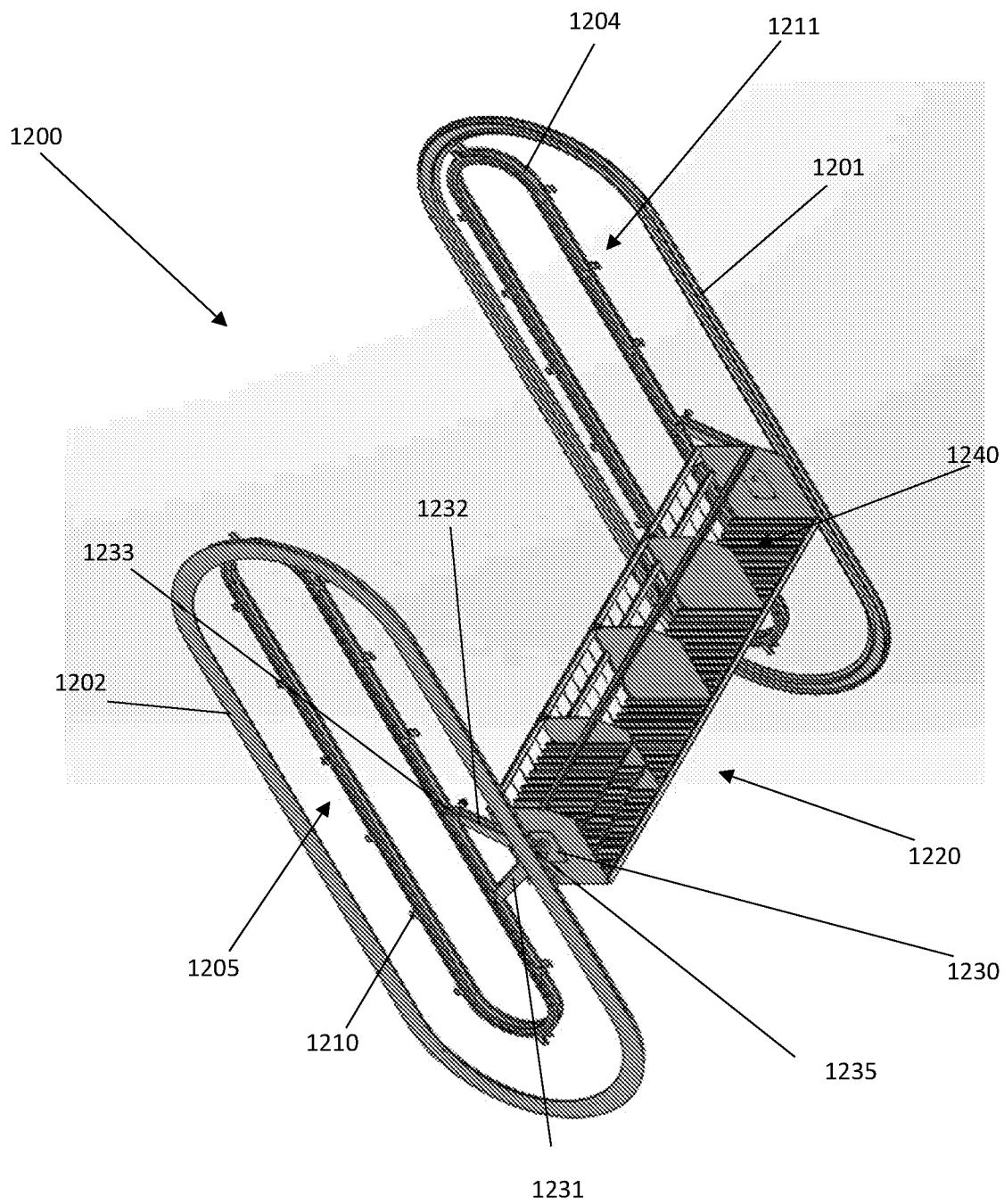
FIG. 12 is an illustration of a perspective view of one embodiment of the rail that shows how the horizontal rows are attached to the rails and chains.

Preferably, each row of compartments is directly or indirectly connected to one or more tracks, belts, or chains, such chain 932. As shown in FIG. 9, the horizontal rows are each connected to a box hanger, such as box hanger 936. As shown in FIG. 12, the box hangers preferably have a hanger rod engagement portion or spindle that allows at least two hanger rods to engage with the box hanger. The box hanger spindle and the hanger rods, such as a hanger rod 934 form a box hanger joint, such as box hanger joint 935. The box hanger joints may preferably allow all of the horizontal rows of compartments to interconnect with each other and the chain 932. As shown, the hanger rod 934 (and potentially additional similar or identical structures) engages with chain 932 at the chain joints, such as chain joint 933, such that as chain 932 is moved, the horizontal rows of compartments move as well. Although chain 932 is preferably a metal interlocking chain that is configured to matingly engage with a toothed gear, in other embodiments, the chain is a metal or rubber belt that is configured to engage with a belt pulley. As shown the chain 932 is preferably connected to chain gears 930 and 931. Chain gear 930 is preferably connected indirectly to drive gear 928 by a drive shaft. Preferably, drive gear 928 may be connected by a drive chain, an example of which is shown in FIG. 6, to motor gear 924, which may be part of or connected to motor 912. The motor 912 is preferably connected to robotic assembly frame 904 but alternatively may be connected to carousel frame 902. Preferably the motor 912 is housed with frame 902 or 904 such that the package delivery machine 900 may be mobile and moved from location to location easily.

Figure 13:
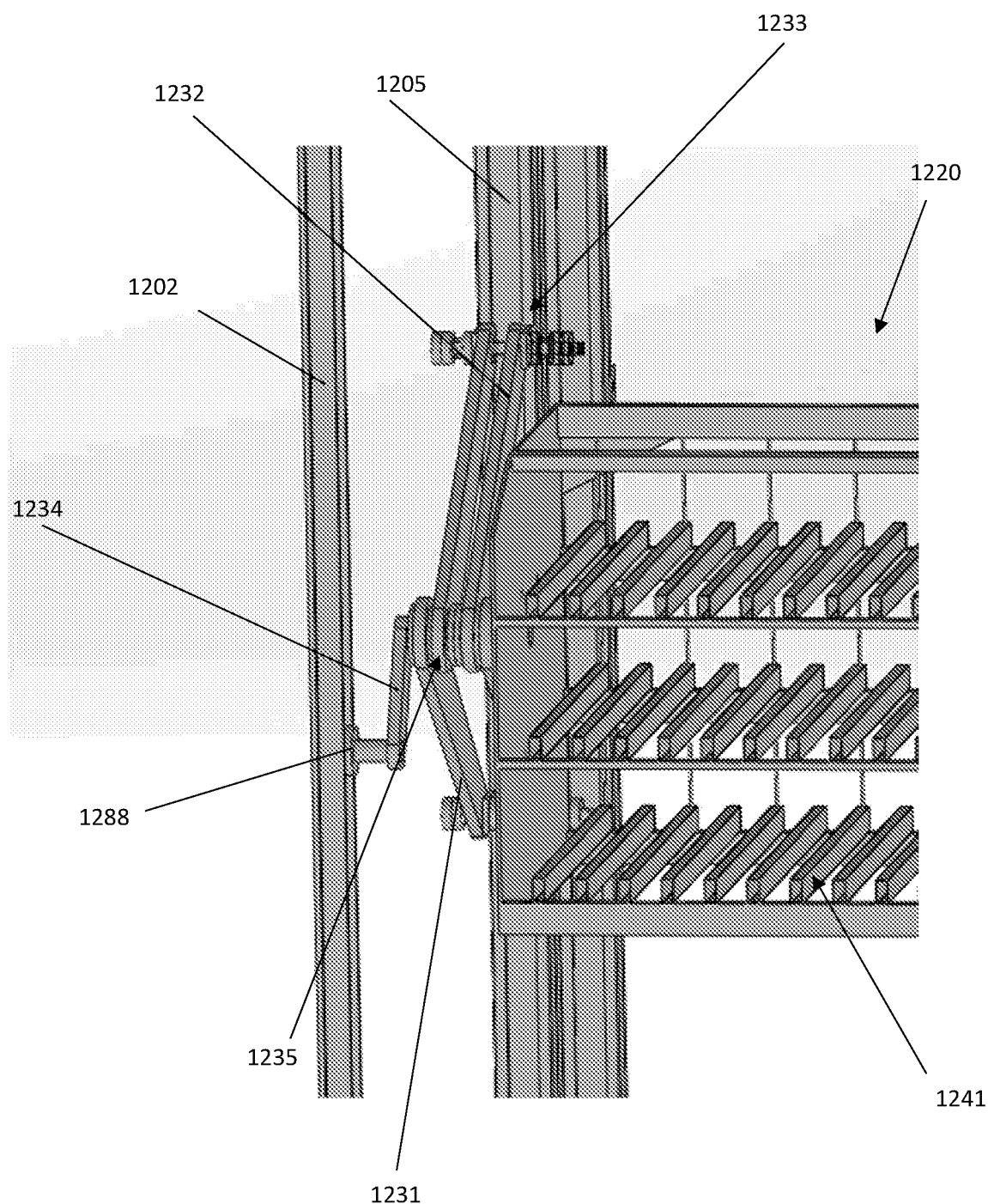
FIG. 13 is an illustration of a perspective view of one embodiment of the row connection.

FIG. 9 also shows that a direction change driver, such as direction change driver 937, may be connected to each of the box hanger joints. Preferably, the direction change drivers indirectly connect the horizontal rows to the carousel rails, as shown in FIG. 13.

FIG. 9 shows that the robotic assembly frame 904 is preferably connected to the carousel frame 902, such that the robotic assembly 980 may be configured to remove packages from the plurality of compartments and deliver them to the customers via package delivery portion 990.

As shown in FIG. 9, the robotic assembly 980 may be a sliding robotic device that aligns a picker arm 984 with the package to be delivered. The robotic assembly 980 may comprise actuators 982, picker arms 984, and supports 986. Preferably, the one or more picker arms 984 engage with a package in one of the compartment and then retract so that the package is removed from the compartment. The supports then slide along carousel rails 988, 989 until the robotic assembly 980 is next to the package delivery portion 990. The suction arm then extends into the package delivery portion 990 and releases the package, which is no available for removal by the customer. As shown in FIG. 9, preferably the carousel rails 988, 989 allow the robotic assembly to access all compartments in each box or row. To access different boxes or rows, the vertical carousel 910 is moved to the desired row to be accessible to robotic assembly 980.

In other embodiments, the robotic assembly 980 may be an articulating arm or claw that physically holds the package to be delivered. In another embodiment, the picking arm may use refreshable adhesives to engage the packages. In another embodiment, the picking arm may us a claw or clamp to physically grasp the package. In another embodiment suction may be used.

The vertical carousel 910 is configured to move the storage containers into a position for engagement by the robotic assembly 980.

The motor 912 may be controlled by the automated package delivery machine 900 such that it starts and stops in order to move the row of storage compartments into a position to automatically load and deliver/unload packages.

Figure 10:
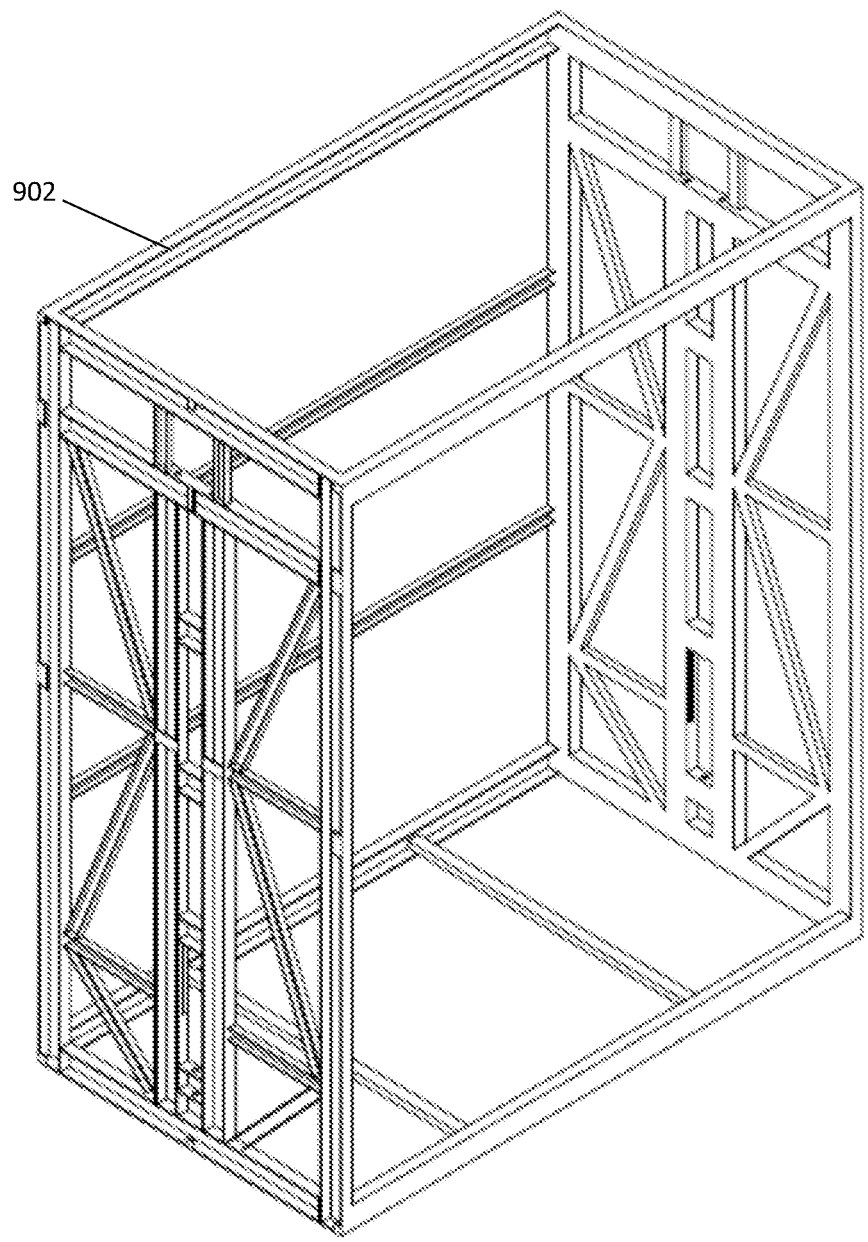
FIG. 10 is an illustration of a perspective view of one embodiment of the frame of the automated package storage and delivery system.

FIG. 10 is an illustration of a perspective view of one embodiment of the frame of the automated package storage and delivery system. As shown in FIG. 10, the carousel frame 902 may be constructed from a plurality of metal beams or rods that interconnect to provide support to the vertical carousel 910 and to provide a protective framework for the system.

Figure 11:
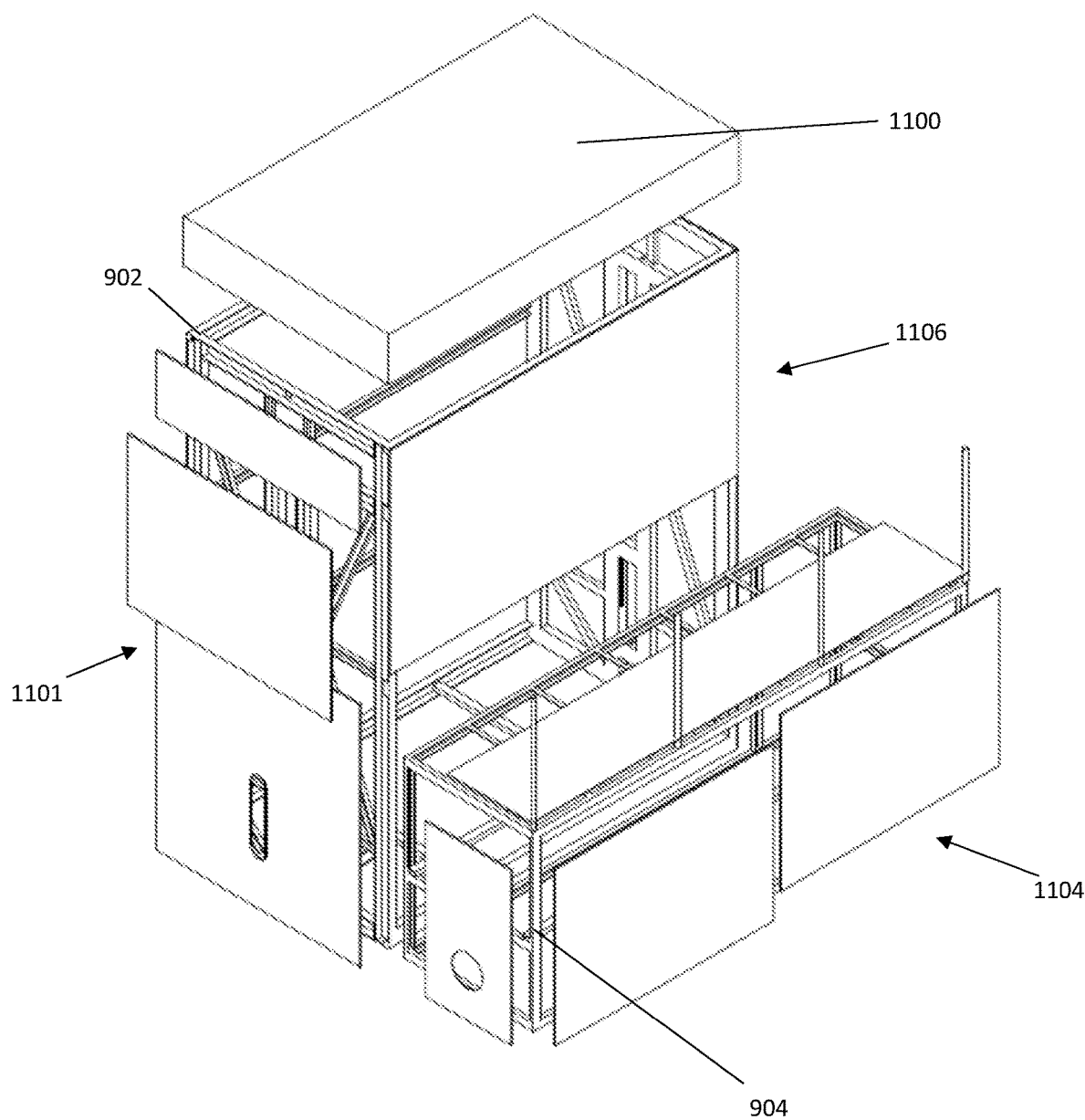
FIG. 11 is an illustration of an exploded view of the cover and the frame of one embodiment of the automated package storage and delivery system.

FIG. 11 is an illustration of an exploded view of the cover and the frame of one embodiment of the automated package storage and delivery system. As shown in FIG. 11, the frames 902 and 904 may be covered by housing panels 1100, 1101, 1104, 1106. The housing panels 1100, 1101, 1104, 1106 preferably protect and secure the packages so that they can only be removed by authorized users through the package delivery portion. The housing panels 1100, 1101, 1104, 1106 preferably allow the vertical carousel and robotic assembly to move freely to accomplish their tasks.

FIG. 12 is an illustration of a perspective view of one embodiment of the rail that shows the horizontal rows attached to the rails and chains. As shown in FIG. 12, a package holding row 1220 may be indirectly connected to and moved by carousel chains 1204, 1205. The package holding row 1220 may be supported by and indirectly connected to carousel rails 1201, 1202. In some embodiments, the package holding row 1220 may be directly connected carousel chains 1204, 1205, and/or carousel rails 1201, 1202. Preferably, the package holding row 1220 may have two box hangers 1230, on either side of the row, which are connected to and/or form part of box hanger joint 1235. Preferably, box hanger joint is connected to connection rods 1231, 1232, which, on an opposite end, may preferably be connected to carousel chain 1205 at one of the chain joints, such as chain joint 1233, 1210, 1211. Preferably, as the carousel chains 1204, 1205, are pulled or otherwise move, the connection rods 1231, 1232 are moved, which subsequently moves the package holding row 1220 along carousel rails 1201, 1202. As shown, carousel rails 1201, 1202 are formed into two loop tracks.

FIG. 12 also shows that the bottom 1240 of the compartments of the rows may be slotted or grooved.

FIG. 13 is an illustration of a perspective view of one embodiment of the row connection. As shown in FIG. 13, the package holding row 1220 may be indirectly connected to and moved by carousel chain 1205. The package holding row 1220 may be supported by and indirectly connected to carousel rail 1202. Preferably, the package holding row 1220 may be directly or indirectly connected to box hanger joint 1235. Preferably, box hanger joint 1235 is connected to connection rods 1231, 1232, which, on an opposite end, may preferably be connected to carousel chain 1205 at one of the chain joints, such as chain joint 1233. FIG. 13 shows that the connection rods 1231, 1232 may each be a set of two parallel rod, which allows the connection rods to alternately connect to the joints (chain and/or box hanger) and provide additional strength and stability.

FIG. 13 shows that direction change driver 1234 may be connected to box hanger joint 1235 and rail engagement device 1288, which may be a wheel, wheels, roller, roller, or other similar device that may be configured to slidingly and/or matingly engage with carousel rail 1202. In addition to connecting the box hanger joint 1235 to the carousel rail 1202, the direction change driver 1234 may be configured to shift positions when the vertical carousel goes in the reverse direction.

FIG. 13 also shows that the bottom 1241 of the compartments or shelves of the rows may be slotted or grooved.

Figure 14:
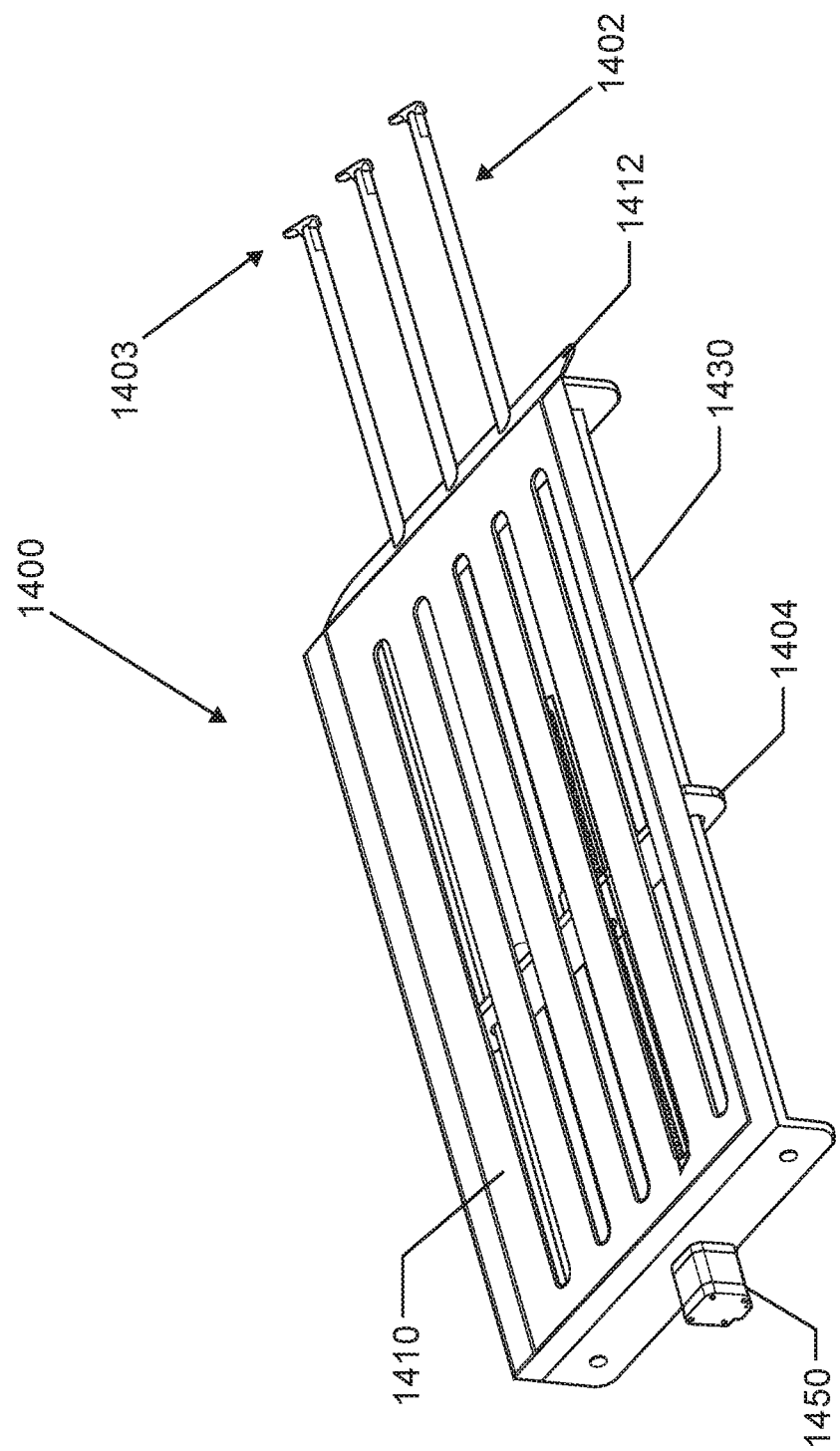
FIG. 14 is an illustration a top perspective view of one embodiment of picker portion of a robotic assembly.

FIG. 14 is an illustration a top perspective view of one embodiment of picker portion of a robotic assembly. As shown in FIG. 14, the picker portion 1400 of the robotic assembly may comprise a top 1410, top incline 1412, base 1430, extension arms 1402, spring-loaded tip hooks 1403, arms base 1404, and extension arm driver 1450. The extension arm driver 1450 may be a motor or actuator that moves the extension arms 1402 into and out of the picker portion 1400. As shown the top 1410 is configured to have a top incline 1412 front and supporting edges on the sides and back. The top 1410 may preferably be configured to accept and hold packages after the robotic assembly retrieves them from the storage compartments. The extension arms 1402 may be configured to be moveably engaged the top incline 1412, such that the extension arms 1402 are able to slide through holes or notches in the top incline 1412. The arms base 1404 may be configured to be moveably engaged to base 1430, such that the arms base 1404 is able to slide along base 1430.

Figure 15:
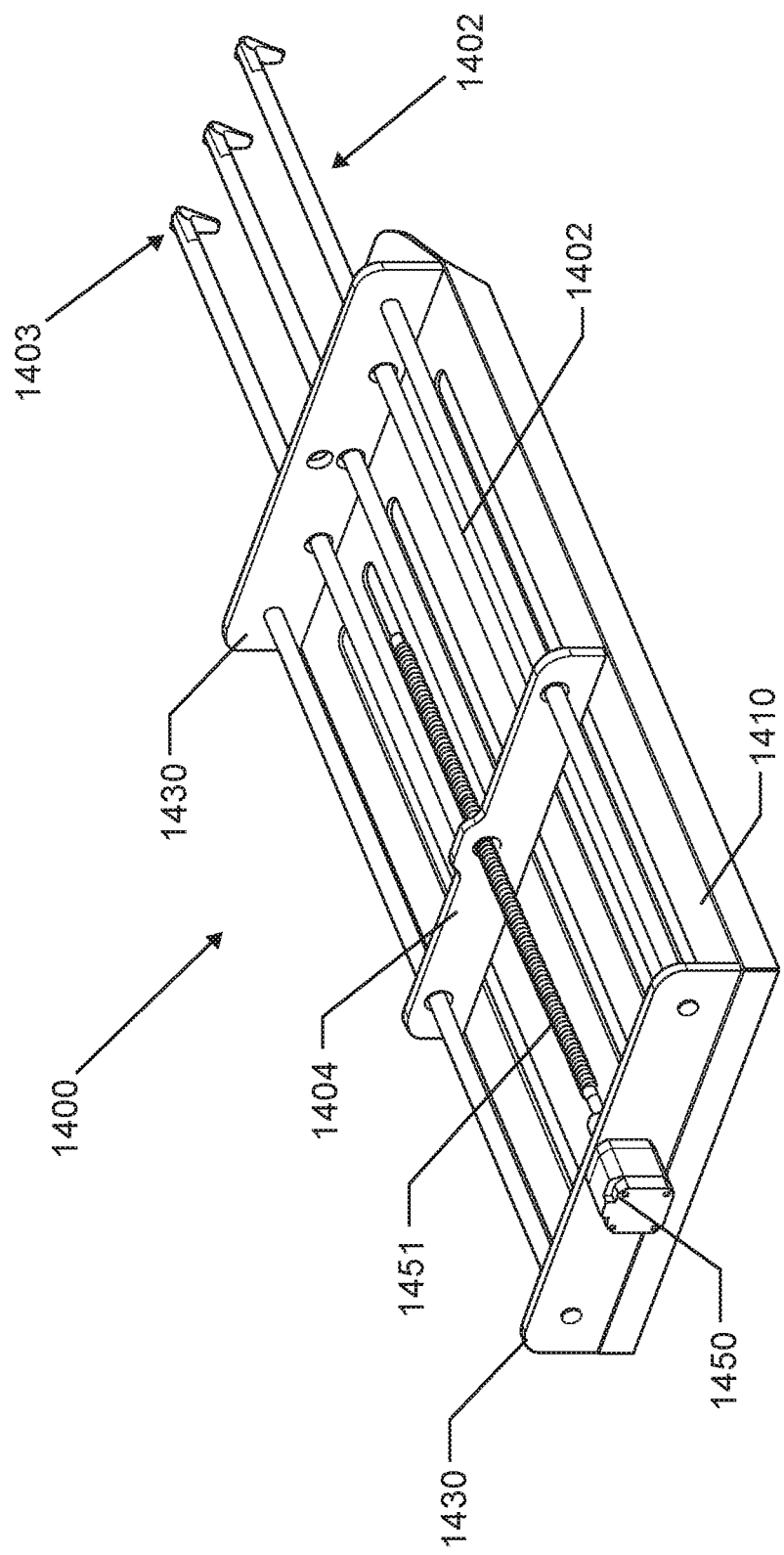
FIG. 15 is an illustration a bottom perspective view of one embodiment of picker portion of a robotic assembly.

FIG. 15 is an illustration a bottom perspective view of one embodiment of picker portion of a robotic assembly. As shown in FIG. 15, the picker portion 1400 of the robotic assembly may comprise a top 1410, top incline 1412, base 1430, extension arms 1402, spring-loaded tip hooks 1403, arms base 1404, driver screw 1451, and extension arm driver 1450. The extension arm driver 1450 may be a motor or actuator that moves the extension arms 1402 into and out of the picker portion 1400 by turning driver screw 1451 in forward or reverse. Preferably, the driver screw 1451 extends to the front of base 1430, such that arms base 1404 may be moved from the very front of base 1430 to the very rear of base 1430.

The arms base 1404 may be configured to be moveably engaged to two side rails of base 1430. The driver screw 1451 may be threadingly engaged with arms base 1404, such that when extension arm driver 1450 is activated, the driver screw 1451 turns and pushes arms base 1404 to a front of picker portion 1400.

Figure 16:
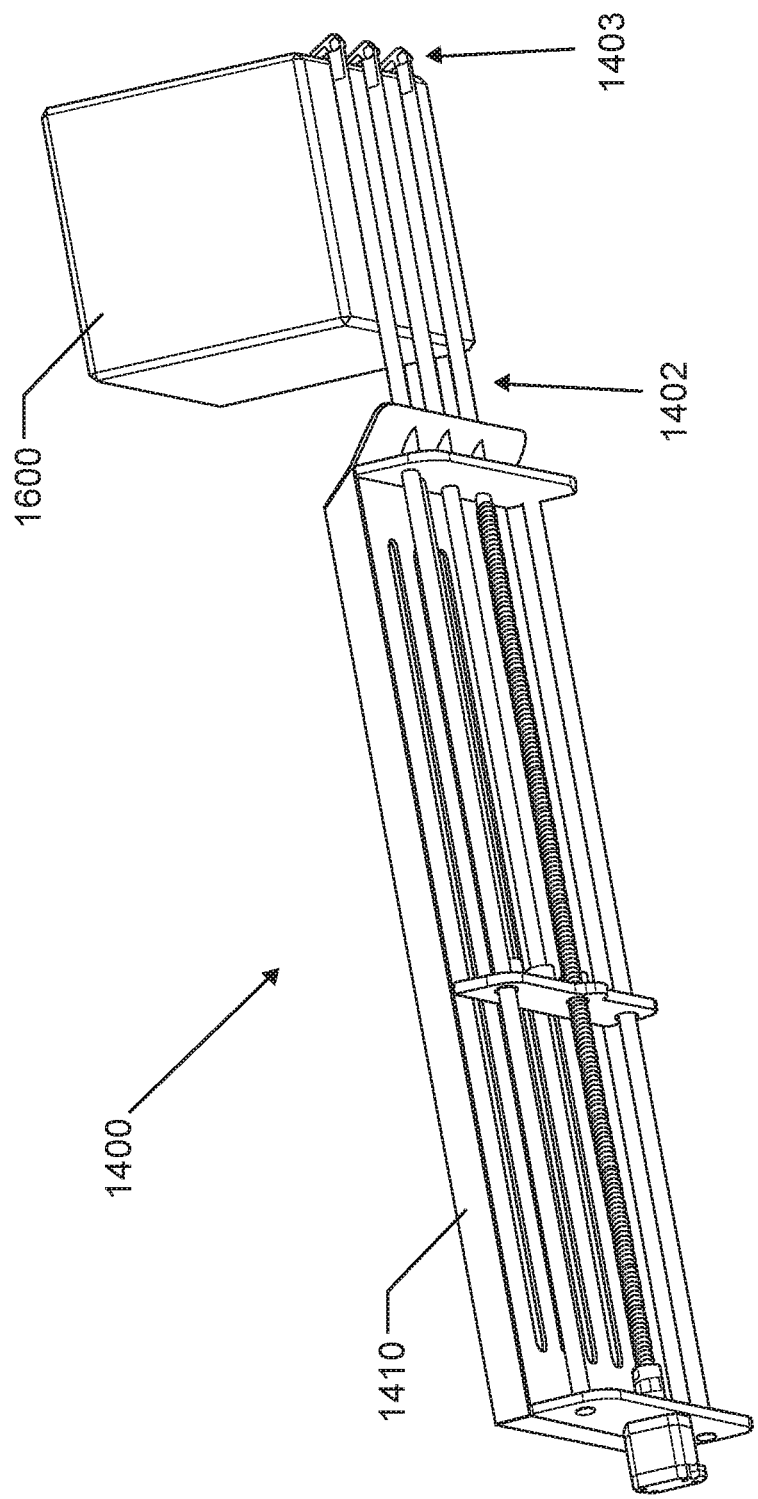
FIG. 16 is an illustration a bottom perspective view of one embodiment of picker portion of a robotic assembly.

FIG. 16 is an illustration a bottom perspective view of one embodiment of picker portion of a robotic assembly. As shown in FIG. 16, the extension arms 1402 of picker portion 1400 may be configured to support and engage with a package 1600. FIG. 16 shows how spring-loaded tip hooks 1403 have slid under package 1600 and then popped up once past the edge of package 1600, such that when the extension arms 1402 are retracted back into the picker portion 1400, the packaged is slid back with the extension arms 1402 until it is resting on the top 1410.

Figure 17:
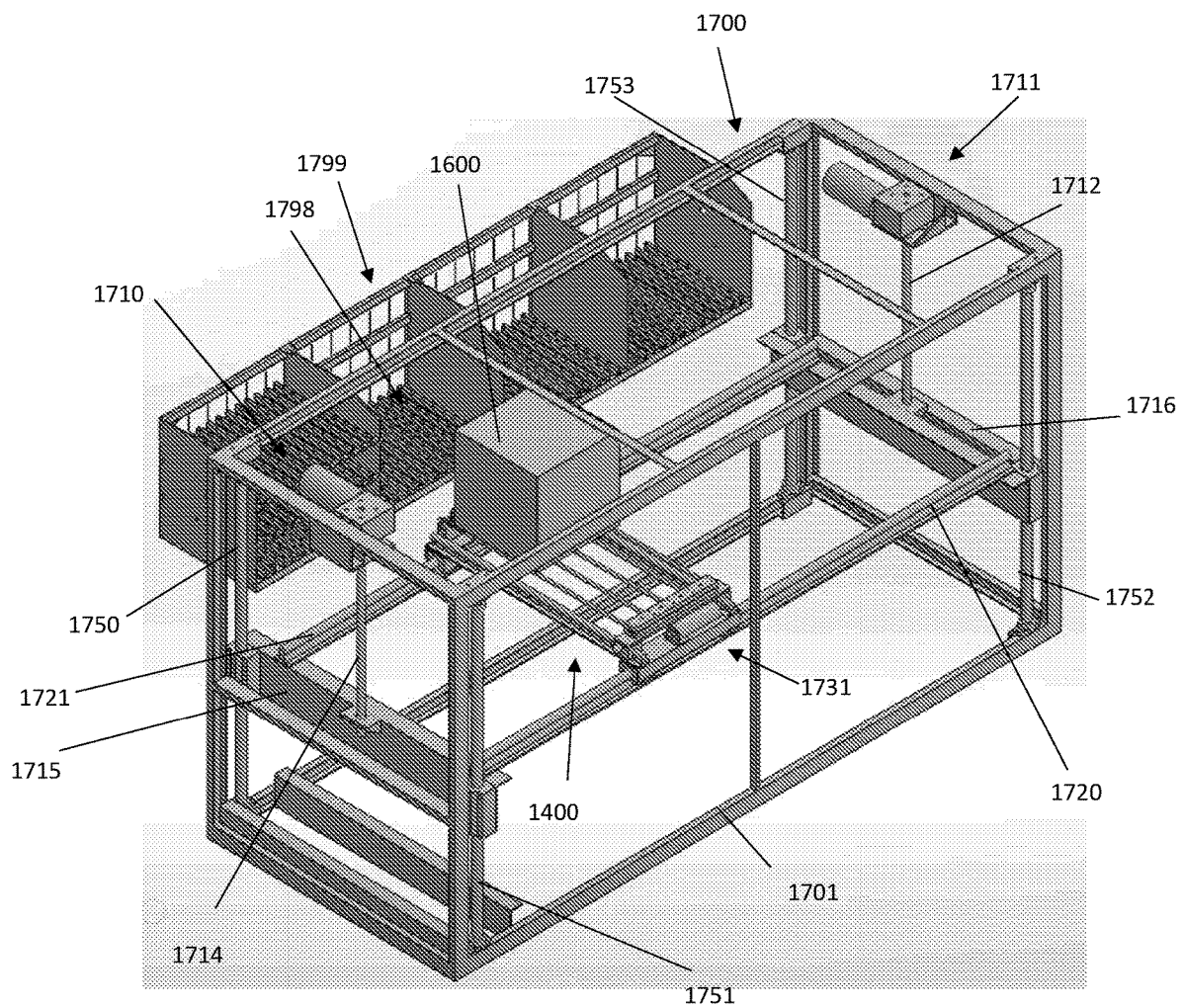
FIG. 17 is an illustration a bottom perspective view of one embodiment of a robotic assembly.

FIG. 17 is an illustration a bottom perspective view of another embodiment of a robotic assembly. As shown in FIG. 17, the robotic assembly 1700 may be supported by a robotic assembly frame 1701, and may comprise picker portion 1400, vertical drivers 1710, 1711, vertical driver screws 1712, 1714, supports 1715, 1716, horizontal driver 1731, horizontal rails 1720, 1721, and vertical support rails 1750, 1751, 1752, 1753. The horizontal driver may be a motor or an actuator that is moves the picker portion 1400 horizontally along the horizontal rails 1720, 1721 so that the picker portion may be precisely lined up with the desired compartment of row 1799. The vertical drivers 1710, 1711 may be motors or actuators that turn the vertical driver screws 1712, 1714, forward or reverse, to move the supports 1715, 1716 up and down along the vertical support rail 1750, 1751, 1752, 1753. Preferably, the supports 1715, 1716 may be threadingly engaged with the vertical driver screws 1712, 1714, such that as the vertical driver screws 1712, 1714 turn, the supports 1715, 1716 move up and down. As shown in FIG. 17, the supports 1715, 1716 are preferably connected to the horizontal rails 1720, 1721, such that as the supports 1715, 1716 go up and down, so too does the picker portion 1400.

FIG. 17 shows how the extension arms 1402 of the picker portion may be configured to matingly engage with the bottom 1798 of the compartment of row 1799, such that the extension arms 1402 slide in between the slots or grooves of the bottom 1798.

Figure 18:
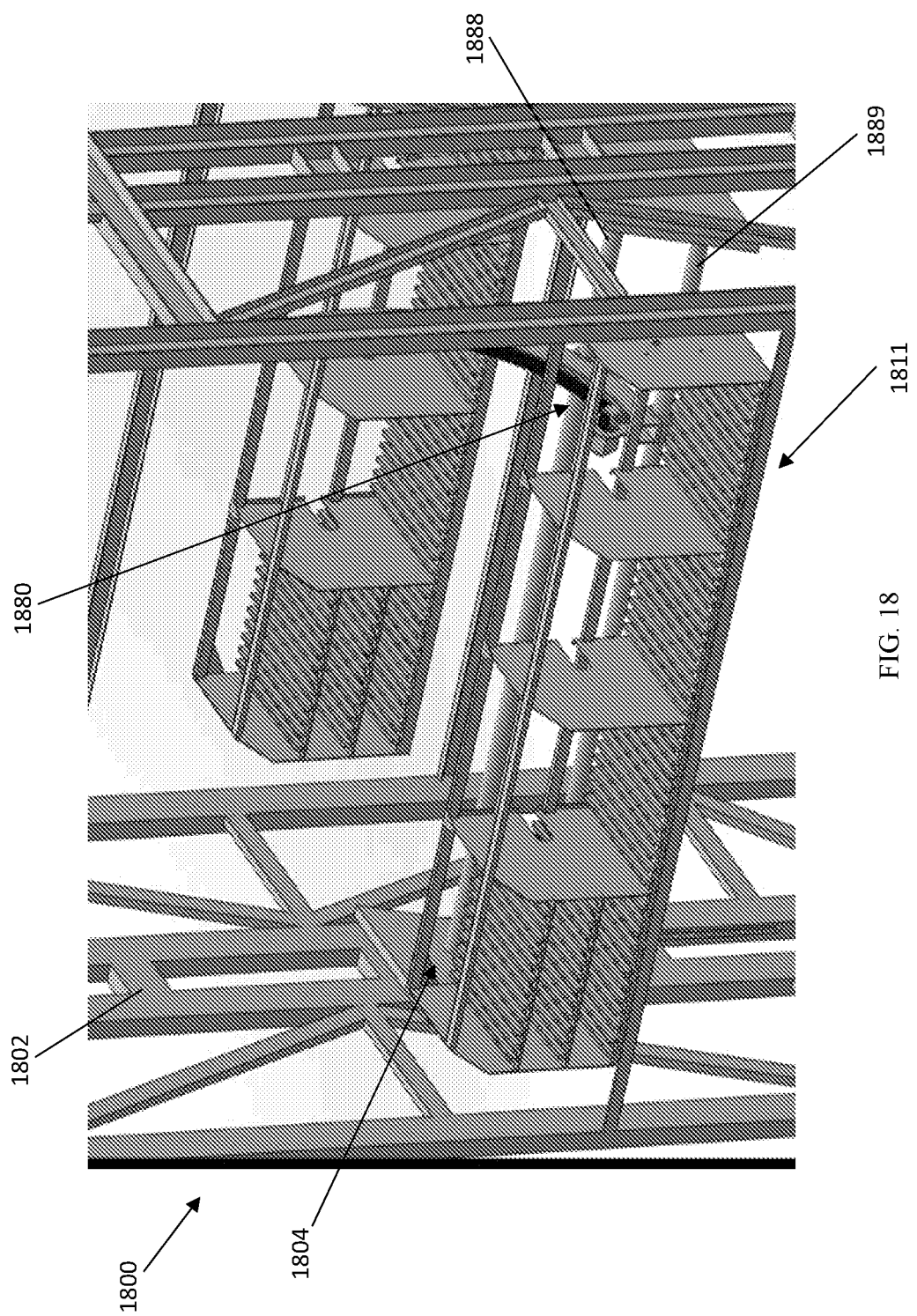
FIG. 18 is an illustration a perspective view of another embodiment of a robotic assembly and vertical carousel showing the robotic assembly on the inside of the carousel.

FIG. 18 is an illustration a perspective view of another embodiment of a robotic assembly and vertical carousel showing the robotic assembly on the inside of the carousel. As shown in FIG. 18, the carousel of the automated package delivery machine 1800 may have an interior space that comprises robotic assembly 1880, horizontal sliding rails 1888, 1889, and end brackets 1804. The end brackets 1804 may connect the horizontal sliding rails 1888, 1889 and the robotic assembly 1880 to the carousel frame, such that the robotic assembly 1880 may be static with respect to the horizontal rows, such as horizontal row 1811. The carousel may move horizontal row 1811 into position such that the robotic assembly 1880 may be engaged and push packages out of the compartments of horizontal row 1811 in order to complete the package delivery process. The packages pushed by the robotic assembly 1880 may be pushed on to or into various slides, conveyors, pickers, or compartments, which may be configured to complete the delivery of the package.

Figure 19:
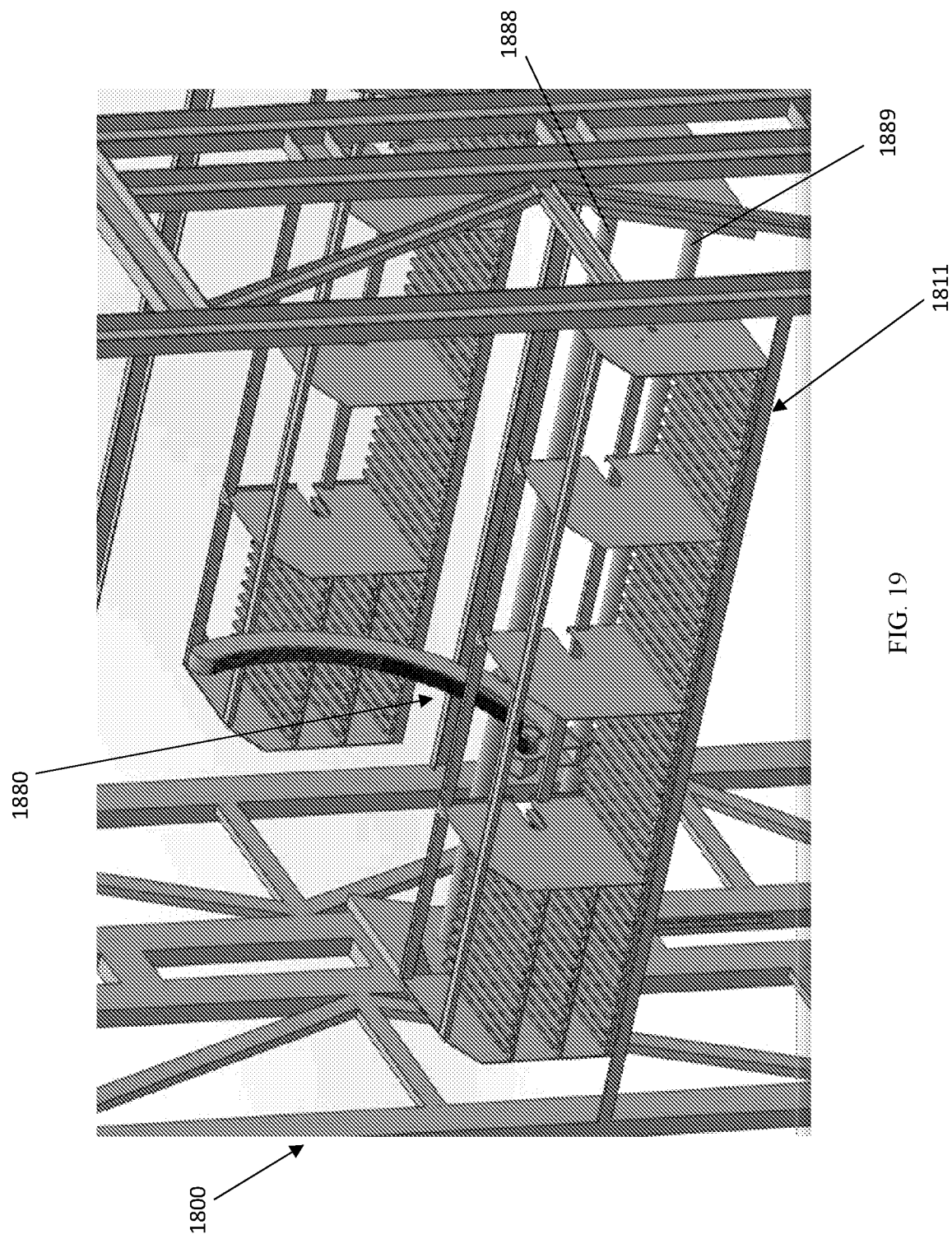
FIG. 19 is an illustration a perspective view of the interior embodiment of a robotic assembly showing that the robotic assembly slides horizontally to the correct compartment.

FIG. 19 is an illustration a perspective view of the interior embodiment of a robotic assembly showing that the robotic assembly slides horizontally to the correct compartment. FIG. 19 shows that the robotic assembly 1880 may slide along the horizontal sliding rails 1888, 1889 such that it is movable from one compartment to another compartment of horizontal row 1811. The sliding action may be accomplished through a motor, actuator, or other electro-mechanical mechanism that smoothly, precisely, and accurately positions the robotic assembly 1880 in a horizontal manner.

Figure 20:
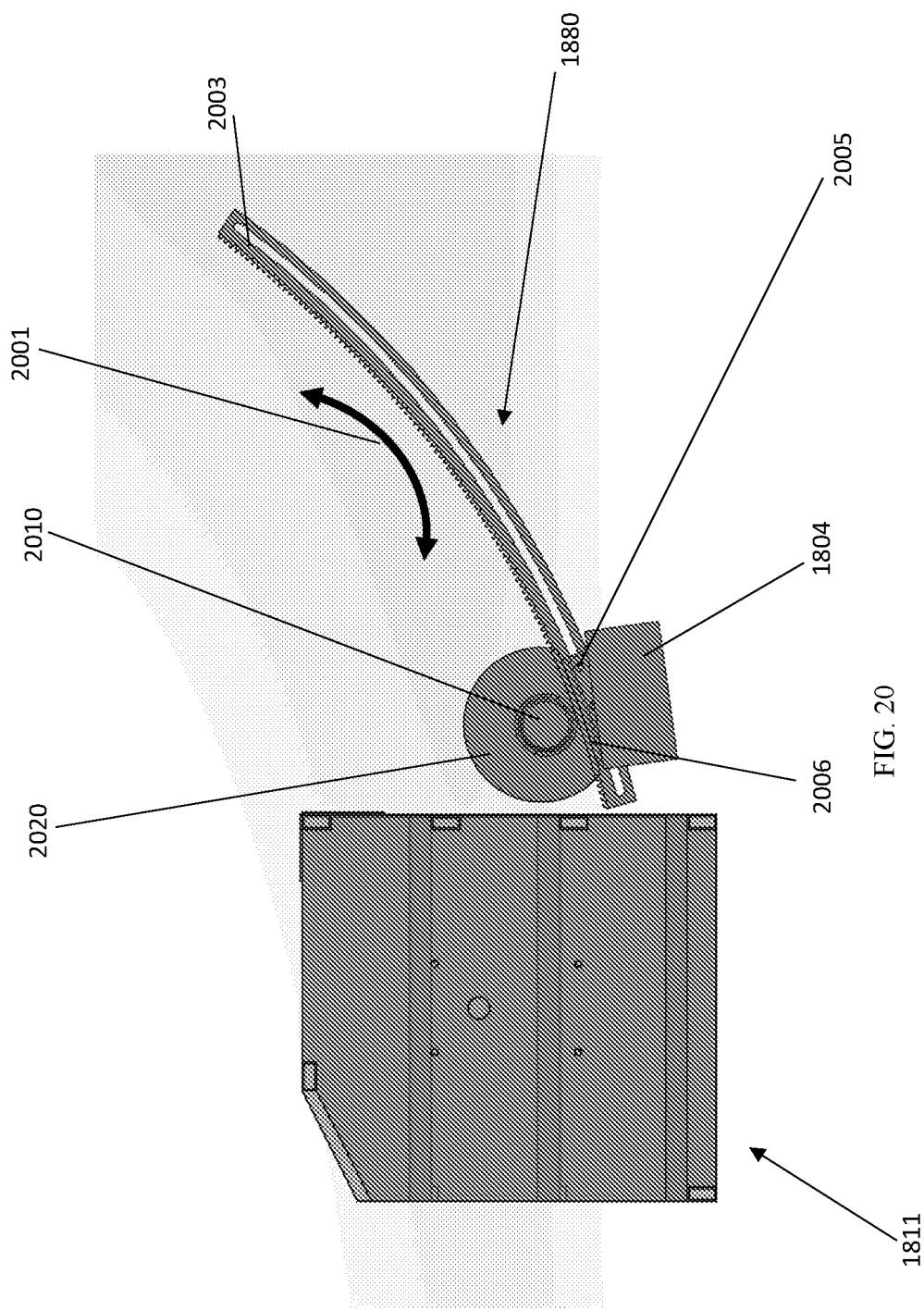
FIG. 20 is an illustration of a side view of a horizontal row and the robotic assembly of one embodiment of the automated package storage and delivery system.

FIG. 20 is an illustration of a side view of a horizontal row and the robotic assembly of one embodiment of the automated package storage and delivery system. As shown in FIG. 20, the robotic assembly 1880 may comprise an end bracket 1804, curved sliding rail 2003, fixed support bracket 2006, bearings 2005, gear 2010, and motor 2020. The curved sliding rail 2003 may be configured to matingly engage with gear 2010 and bearings 2005, such that when the motor 2020 turns, either forward or backward, the curved sliding rail 2003 smoothly slides forward or backward 2001, with respect to the fixed support bracket 2006.

FIGS. 18 and 19 show that the curved sliding rail may be in a withdrawn position in order for the robotic assembly to slide back and forth on the horizontal rails.

Figure 21:
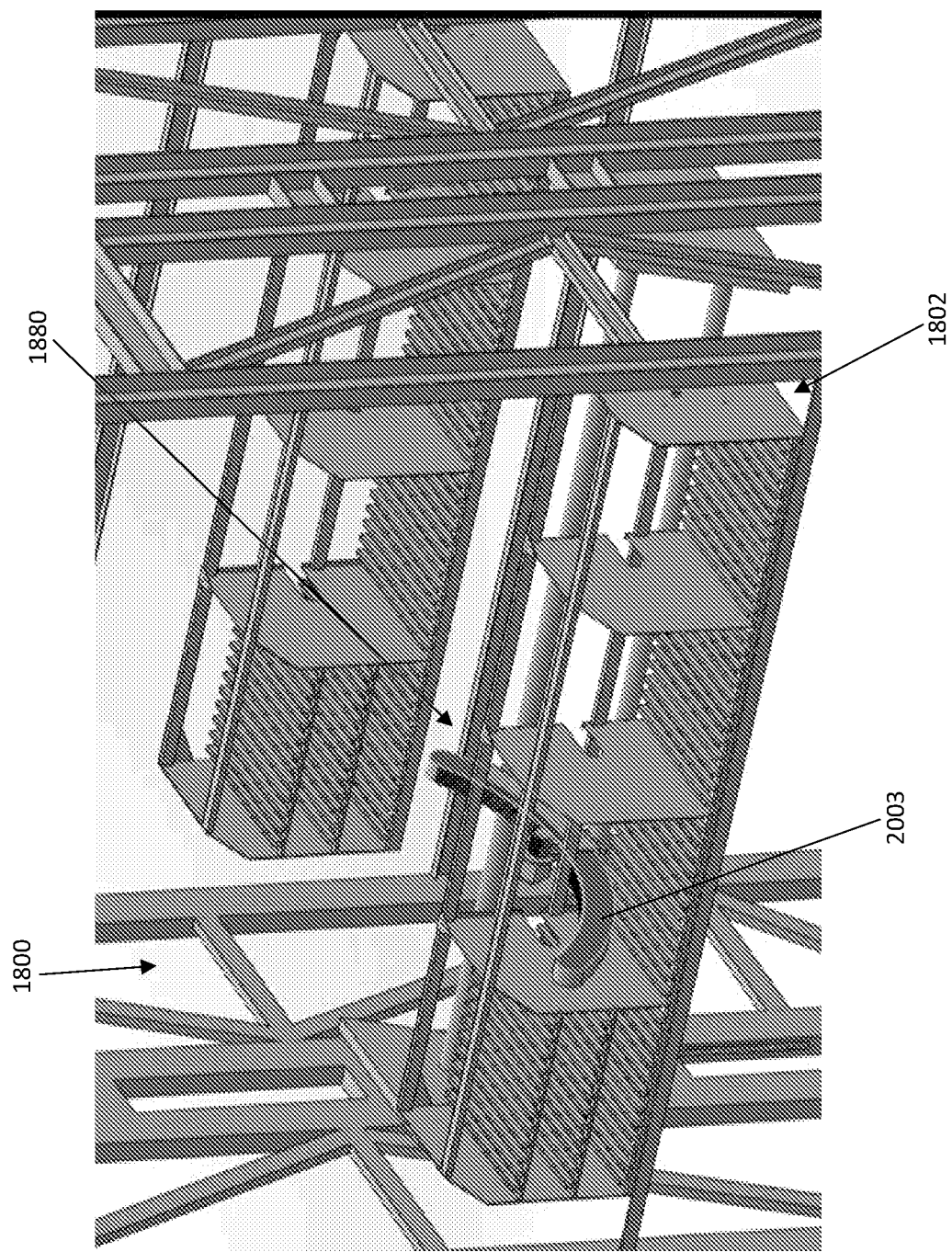
FIG. 21 is an illustration a perspective view of the interior embodiment of a robotic assembly showing that the robotic assembly may push packages out of the compartments.

FIG. 21 is an illustration a perspective view of the interior embodiment of a robotic assembly showing that the robotic assembly may push packages out of the compartments of row 1802. As shown in FIG. 21, the curved sliding rail 2003 has been slid forward by robotic assembly 1880, which preferably may cause a package in that compartment to be pushed out of the compartment and then delivered to the user.

Figure 22:
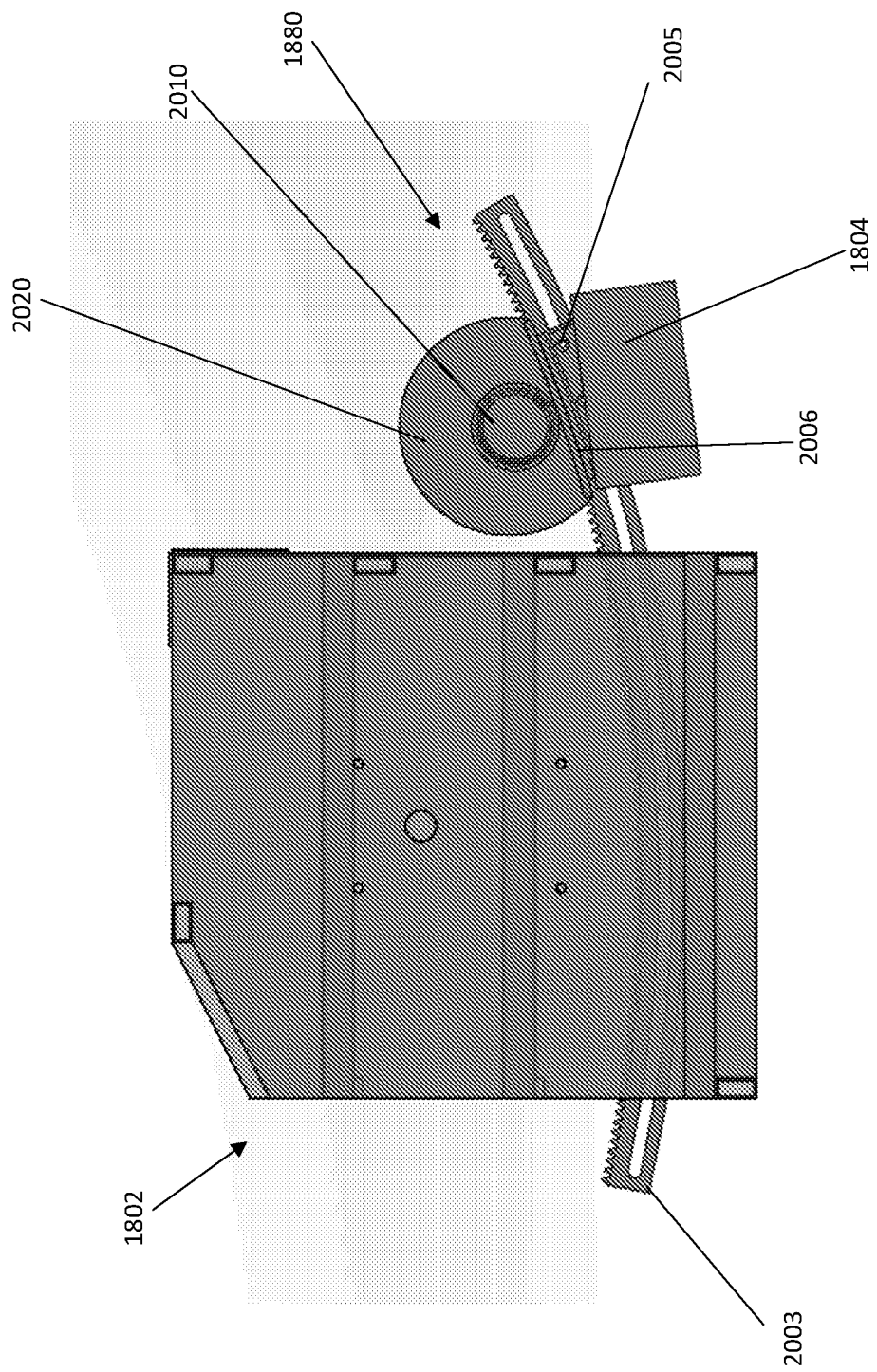
FIG. 22 is an illustration of a side view of a horizontal row and the robotic assembly showing that the robotic assembly may slide to engage packages in the compartments.

FIG. 22 is an illustration of a side view of a horizontal row and the robotic assembly showing that the robotic assembly may slide to engage packages in the compartments. As shown in FIG. 22, the curved sliding rail 2003 has been slid forward by robotic assembly 1880, which preferably may cause a package in that compartment to be pushed out of the compartment and then delivered to the user.

Figure 23:
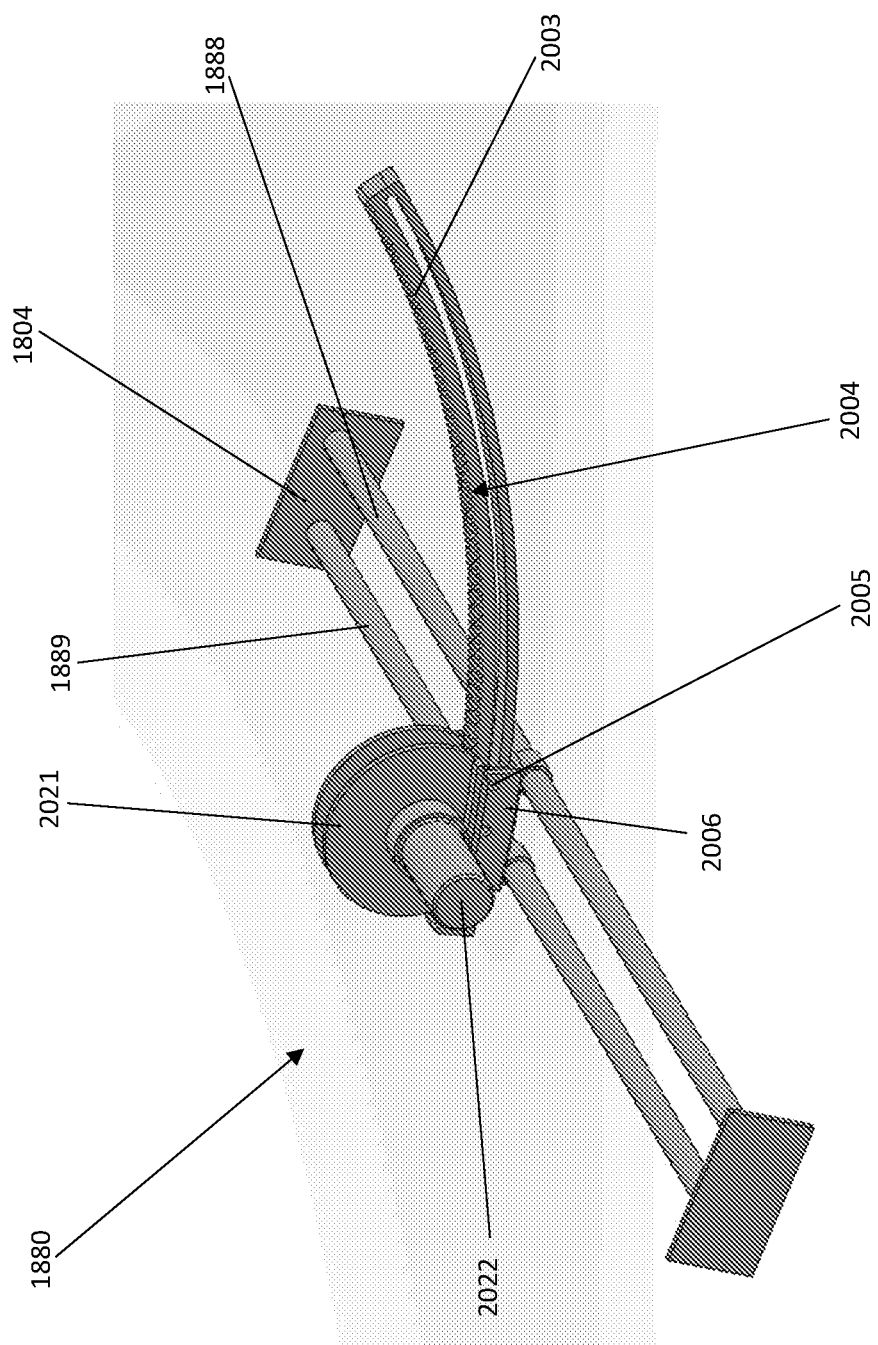
FIG. 23 is an illustration a perspective view of one embodiment of a robotic assembly.

FIG. 23 is an illustration a perspective view of one embodiment of a robotic assembly. As shown in FIG. 23, the robotic assembly 1880 may comprise end brackets 1804, horizontal sliding rails 1888, 1889, curved sliding rail 2003, fixed support bracket 2006, bearings 2005, motor 2022, and gear housing 2021. FIG. 23 shows that the curved sliding rail 2003 has a plurality of notches or teeth 2004 (sometimes referred to as a saw-toothed pitch) that may matingly engage with gear 2010. The curved sliding rail 2003 may also not have teeth and instead may engage via friction with the gear 2010. The fixed support bracket 2006 may slide horizontally along horizontal sliding rails 1888, 1889 via a motor, a pulley system, or actuator. Although not shown in FIG. 23, the horizontal motor, driver, or actuator may be similar to what is shown in FIGS. 8 and 17 (horizontal driver 1731). For purposes of this disclosure, a motor, driver, or actuator may be similar types of devices that allow for the electro-mechanical movement of portions of the package delivery system of the present disclosure.

Figure 24:
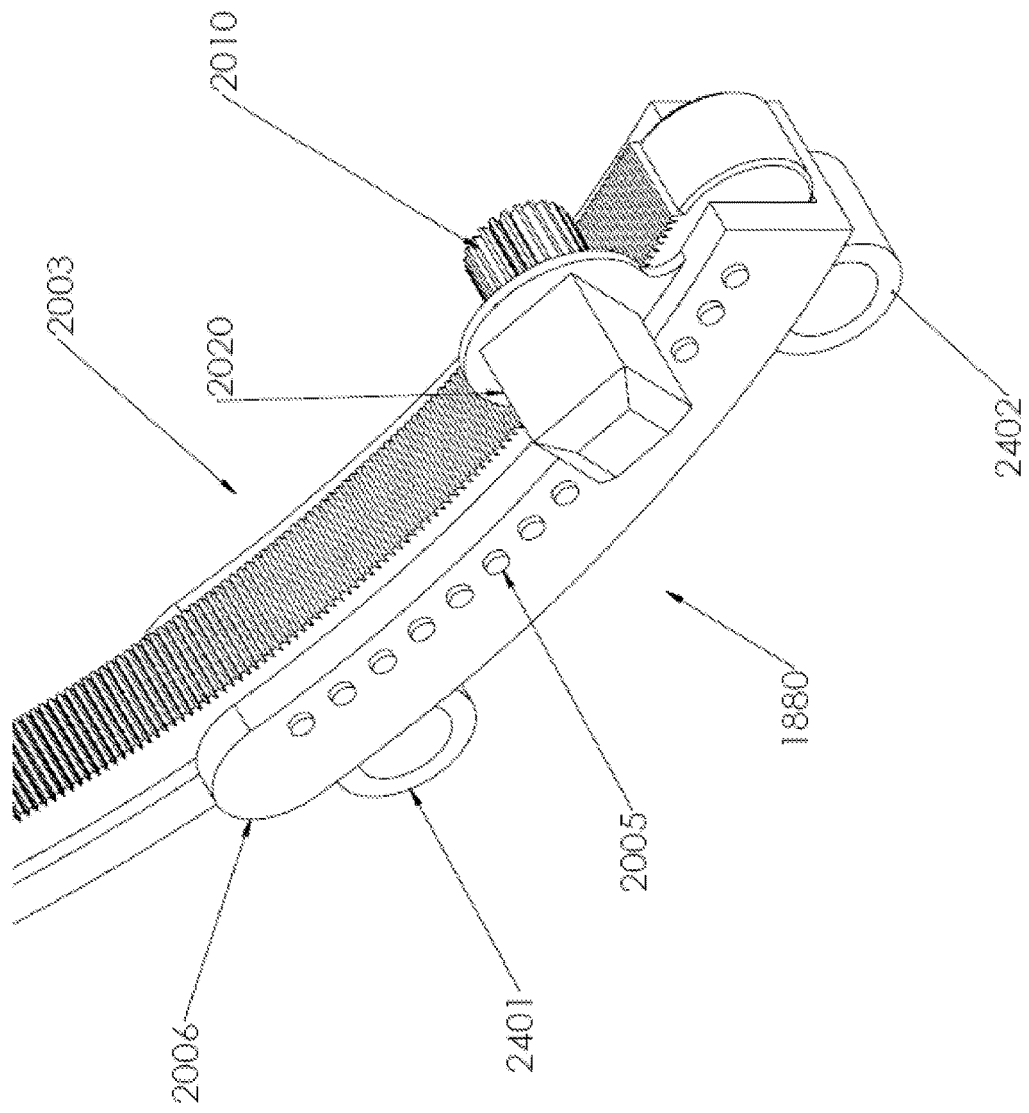
FIG. 24 is an illustration a perspective view of a portion of one embodiment of a robotic assembly.

FIG. 24 is an illustration a close-up perspective view of a portion of one embodiment of a robotic assembly. As shown in FIG. 24, the curved sliding rail 2003 may engage with a fixed support bracket 2006, such that the curved sliding rail 2003 is moveably, but securely, engaged with the fixed support bracket 2006. The bearings 2005 are held in place by the fixed support bracket and moveably engage with the curved sliding rail 2003. In this manner, the curved sliding rail 2003 slides back and forth with respect to the fixed support bracket 2006 and bearings 2005. The curved sliding rail 2003 is driven by motor 2020 and gears 2010. The fixed support bracket 2006 is connected to two gliders 2401, 2402, which are configured to be able to slide horizontally along horizontal sliding rails 1888, 1889.

Figure 25:
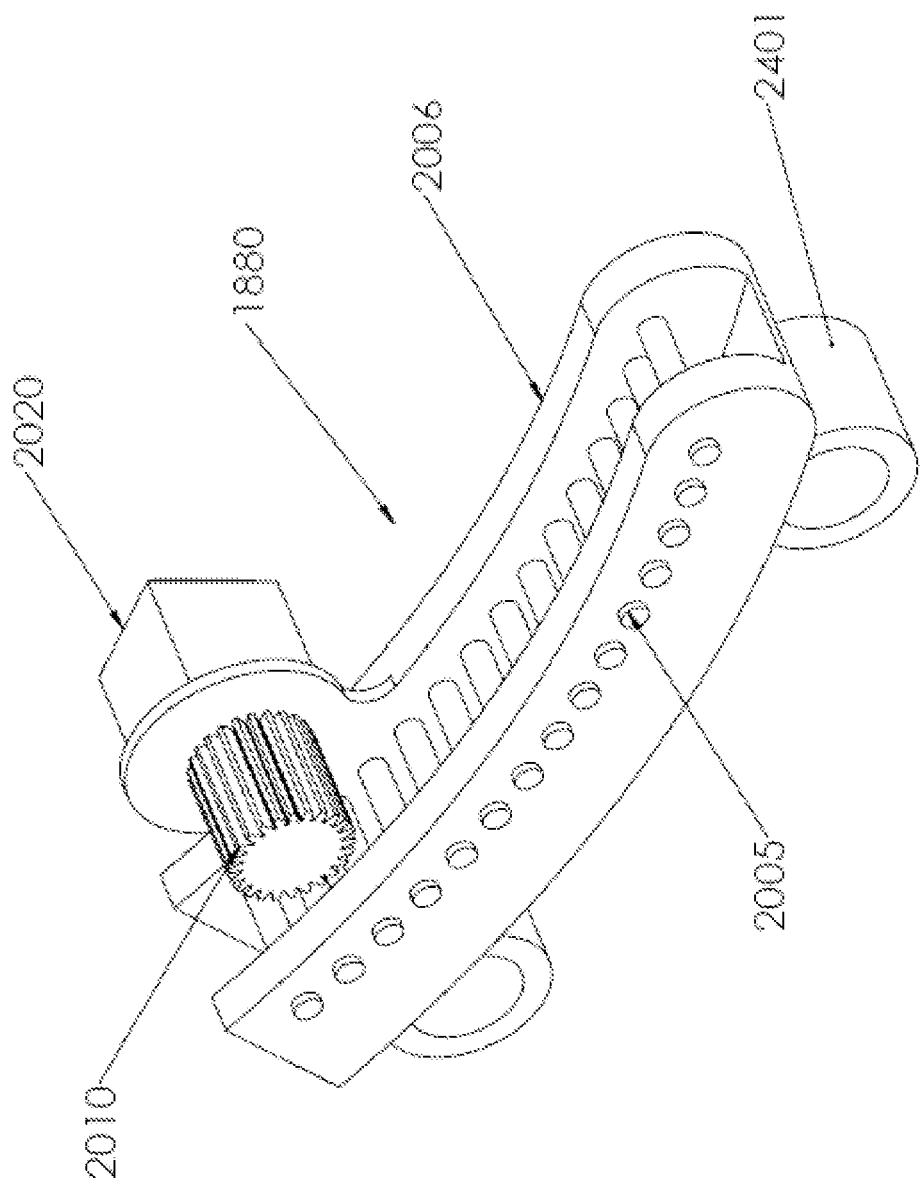
FIG. 25 is an illustration a perspective view of a portion of one embodiment of a robotic assembly without the curved sliding rail.

FIG. 25 is an illustration a perspective view of a portion of one embodiment of a robotic assembly without the curved sliding rail. As shown in FIG. 25, the robotic assembly may comprise a fixed support bracket 2006, bearings 2005, motor/gearbox 2020, gear 2010, and gliders 2401, 2402. As shown, the fixed support bracket 2006 may preferably be curved, which allows for a more compact design.

In alternative embodiments, the sliding rail and fixed support may be substantially straight, such that the rail moves horizontally rather than diagonally (horizontally and vertically).

Figure 26:
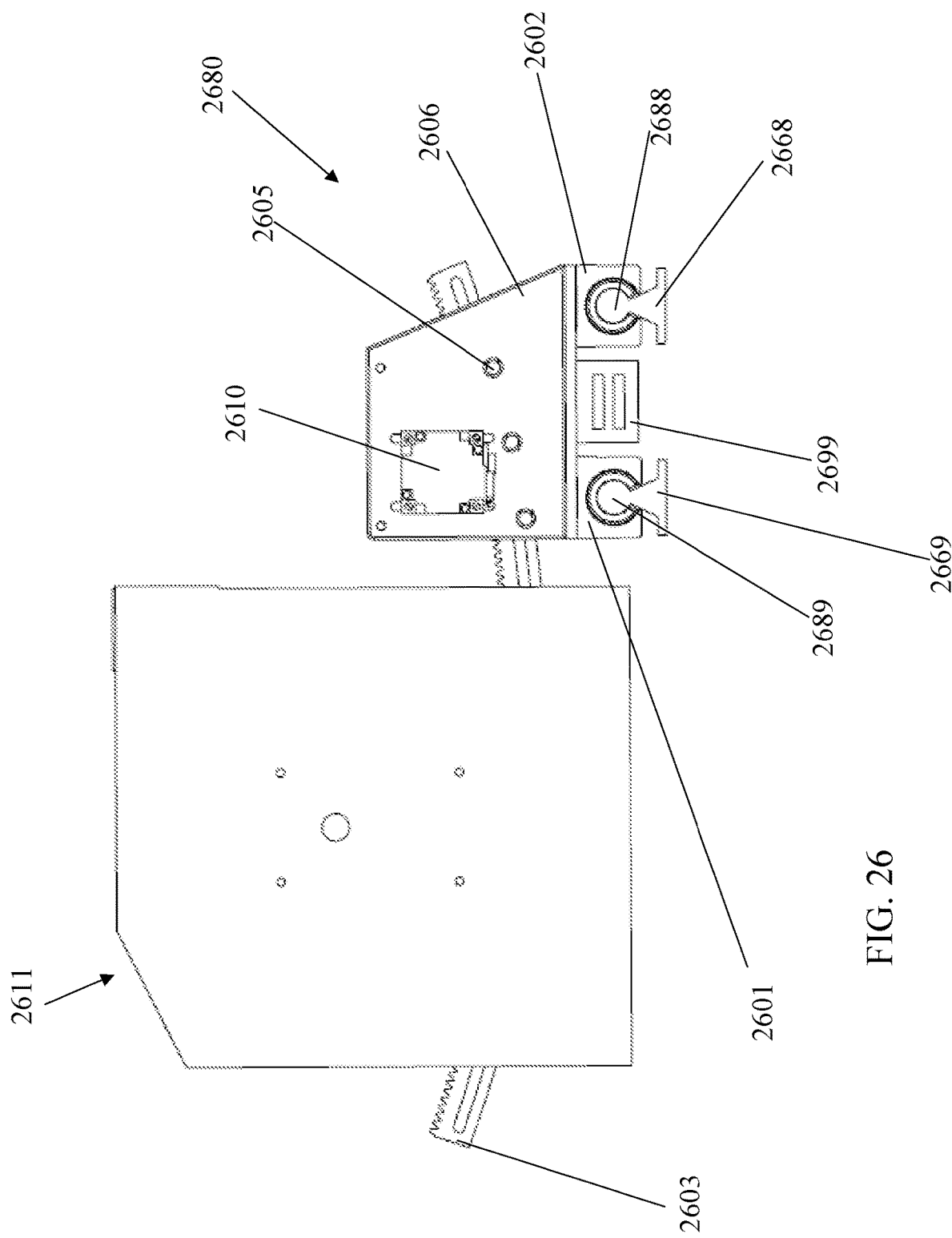
FIG. 26 is an illustration of a side view of a horizontal row and the robotic assembly of another embodiment of the automated package storage and delivery system.

FIG. 26 is an illustration of a side view of a horizontal row and the robotic assembly of another embodiment of the automated package storage and delivery system. As shown in FIG. 26, the robotic assembly 2680 may comprise curved sliding rail 2603, fixed support bracket 2606, bearings 2605, motor and gearbox 2610, gliders 2601, 2602, and horizontal motor 2699. FIG. 26 shows that the robotic assembly 2680 may slide or move sliding rail 2603 to engage packages in the compartments of the horizontal row 2611. As shown in FIG. 26S, the curved sliding rail 2603 has been slid forward by robotic assembly 1680, which preferably may cause a package in that compartment to be pushed out of the compartment and then delivered to the user. FIG. 26 also shows how the gliders 2601, 2602 may engage with horizontal rails 2688, 2689. Horizontal rails 2688, 2689 may be supported by bases 2668, 2669. Motor and gearbox 2699 may move the robotic assembly 2680 back and forth along the horizontal rails 2601, 2602. The embodiment of the fixed support bracket 2606 shown in FIG. 26 may act as a cover for the gears that are connected to motor and gearbox 2610.

Operational embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, a DVD disk, or any other form of storage medium known in the art. An exemplary storage medium is coupled to the processor such that the processor may read information from, and write information to, the storage medium. In the alternative, the storage medium may be integral to the processor. The processor and the storage medium may reside in an ASIC or may reside as discrete components in another device.

Furthermore, the one or more versions may be implemented as a method, apparatus, or article of manufacture using standard programming and/or engineering techniques to produce software, firmware, hardware, or any combination thereof to control a computer to implement the disclosed embodiments. Non-transitory computer readable media may include but are not limited to magnetic storage devices (e.g., hard disk, floppy disk, magnetic strips), optical disks (e.g., compact disk (CD), digital versatile disk (DVD)), smart cards, and flash memory devices (e.g., card, stick). Those skilled in the art will recognize many modifications may be made to this configuration without departing from the scope of the disclosed embodiments.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those of ordinary skill in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. An automated package delivery machine, comprising:
a plurality of housing panels;
a carousel frame;
a robotic assembly frame;

a package delivery portion with one or more auto-lock doors;
a vertical carousel;
a motor, comprising a motor gear; and
a robotic assembly;
wherein said plurality of housing panels substantially encloses said carousel frame and said robotic assembly frame, and substantially prevents unwanted access to an interior of said automated package delivery machine;
wherein said vertical carousel comprises a plurality of horizontal rows, one or more carousel chains, one or more carousel rails, one or more chain gears, at least one drive gear, at least one drive chain, a plurality of connection rods, a plurality of direction change drivers, and a plurality of rail engagement devices;
wherein each of said plurality of horizontal rows has two box hangers and one or more compartments, which are configured to hold one or more packages;
wherein each of said two box hangers of each of said plurality of horizontal rows are operatively connected to (i) at least two of said plurality of connection rods, which, on an opposite end are connected to one of said one or more carousel chains, and (ii) at least one of said plurality of direction change drivers, which on an opposite is connected to one of said plurality of rail engagement devices, which are operatively engaged with one of said one or more carousel rails;
wherein said one or more carousel rails are connected to and supported by said carousel frame;
wherein said one or more carousel chains are operatively connected to said one or more chain gears, which are connected to and supported by said carousel frame;
wherein at least one of said one or more chain gears is operatively connected to said at least one drive gear, which is operatively connected to said at least one drive chain, which is operatively connected to said motor gear;
wherein said motor is configured to cause said one or more carousel chains to move, which in turn causes said plurality of horizontal rows to move along said one or more carousel rails, which each form a loop track;
wherein said robotic assembly may comprise a picker portion, one or more vertical drivers, at least one horizontal driver, one or more vertical support rails, and one or more horizontal rails;
wherein said at least one horizontal driver is configured to move said picker portion horizontally along said one or more horizontal rails;
wherein said one or more vertical drivers are configured to move said picker portion vertically along said one or more vertical support rails;
wherein said picker portion comprises a top, one or more extension arms, and at least one extension arm driver;
wherein said at least one extension arm driver is configured to move said one or more extension arms out of and into said picker portion;
wherein said one or more extension arms are configured to engage with said one or more packages that are being held in said one or more compartments;
wherein said picker portion is configured to move said one or more packages from said one or more compartments to said package delivery portion, such that one or more customers may retrieve said one or more packages via said one or more auto-lock doors.

2. The automated package delivery machine of claim 1, wherein said one or more extension arms comprise spring loaded tip hooks that are configured to engage with said one or more packages when moving said one or more packages from said one or more compartments to said picker portion.

3. The automated package delivery machine of claim 1, wherein said picker portion further comprises a top incline, which matingly engages with said one or more extension arms and is configured to allows said one or more packages to be moved to said top of said picker portion.

4. The automated package delivery machine of claim 1, wherein each of said one or more compartments have a bottom;
wherein said bottom is grooved and configured to allow said one or more extension arms to pass under said one or more packages in order to move said one or more packages from said one or more compartments to said top of said picker portion.

5. The automated package delivery machine of claim 1, wherein one or more of said one or more compartments have one or more stacked shelves.

6. The automated package delivery machine of claim 1, further comprising a central access display that is configured to be engaged with by said one or more customers to have said one or more packages from said automated package delivery machine delivered to said one or more customers.

7. The automated package delivery machine of claim 1, wherein said plurality of housing panels are configured to provide access to one or more deliver persons to load said one or more packages into said one or more compartments.

8. The automated package delivery machine of claim 1, wherein said one or more auto-lock doors are configured to unlock automatically so said one or more customers may retrieve said one or more packages from said automated package delivery machine.

9. The automated package delivery machine of claim 1, wherein said automated package delivery machine is substantially a permanent installation.

10. The automated package delivery machine of claim 1, wherein said automated package delivery machine is substantially a mobile installation.

11. The automated package delivery machine of claim 1, wherein said automated package delivery machine is in a publicly accessible location.

12. The automated package delivery machine of claim 1, wherein said one or more vertical drivers and said one or more vertical support rails are connected to said robotic assembly frame.

13. An automated package delivery machine, comprising:
a plurality of housing panels;
a carousel frame;
a package delivery portion with one or more auto-lock doors;
a vertical carousel;
a motor, comprising a motor gear; and
a robotic assembly;
wherein said plurality of housing panels substantially encloses said carousel frame and substantially prevents unwanted access to an interior of said automated package delivery machine;
wherein said vertical carousel comprises a plurality of horizontal rows, one or more carousel chains, one or more carousel rails, one or more chain gears, at least one drive gear, at least one drive chain, a plurality of connection rods, a plurality of direction change drivers, and a plurality of rail engagement devices;
wherein each of said plurality of horizontal rows has two box hangers and one or more compartments, which are configured to hold one or more packages;

wherein each of said two box hangers of each of said plurality of horizontal rows are operatively connected to (i) at least two of said plurality of connection rods, which, on an opposite end are connected to one of said one or more carousel chains, and (ii) at least one of said plurality of direction change drivers, which on an opposite is connected to one of said plurality of rail engagement devices, which are operatively engaged with one of said one or more carousel rails;

wherein said one or more carousel rails are connected to and supported by said carousel frame;

wherein said one or more carousel chains are operatively connected to said one or more chain gears, which are connected to and supported by said carousel frame;

wherein at least one of said one or more chain gears is operatively connected to said at least one drive gear, which is operatively connected to said at least one drive chain, which is operatively connected to said motor gear;

wherein said motor is configured to cause said one or more carousel chains to move, which in turn causes said plurality of horizontal rows to move along said one or more carousel rails, which each form a loop track;

wherein said robotic assembly may comprise a curved sliding rail, one or more horizontal rails, a fixed support bracket, a robotic assembly motor, and one or more end brackets;

wherein said fixed support bracket comprises a plurality of bearings;

wherein said fixed support bracket is configured to slidingly and matingly engage said curved sliding rail;

wherein said fixed support bracket is configured to matingly engage with said one or more horizontal rails, such that said fixed support bracket may slide horizontally along said one or more horizontal rails;

wherein said one or more horizontal rails are connected to said one or more end brackets, and wherein said one or more end brackets are connected to said carousel frame, which that said robotic assembly is in an interior of said vertical carousel;

wherein said robotic assembly motor is configured to move said curved sliding rail in a back and forth manner, such that said curved sliding rail is configured to push said one or more packages out of said one or more compartments to said package delivery portion, such that one or more customers may retrieve said one or more packages via said one or more auto-lock doors.

14. The automated package delivery machine of claim 13, wherein one or more of said one or more compartments have one or more stacked shelves.

15. The automated package delivery machine of claim 13, further comprising a central access display that is configured to be engaged with by said one or more customers to have said one or more packages from said automated package delivery machine delivered to said one or more customers.

16. The automated package delivery machine of claim 13, wherein said plurality of housing panels are configured to provide access to one or more deliver persons to load said one or more packages into said one or more compartments.

17. The automated package delivery machine of claim 13, wherein said one or more auto-lock doors are configured to unlock automatically so said one or more customers may retrieve said one or more packages from said automated package delivery machine.

18. The automated package delivery machine of claim 13, wherein said automated package delivery machine is substantially a permanent installation.

19. The automated package delivery machine of claim 13, wherein said automated package delivery machine is substantially a mobile installation.

20. The automated package delivery machine of claim 13, wherein said automated package delivery machine is in a publicly accessible location.

* * * * *